United States Patent
Kashitani

(10) Patent No.: US 10,175,857 B2
(45) Date of Patent: Jan. 8, 2019

(54) IMAGE PROCESSING DEVICE, IMAGE PROCESSING METHOD, AND PROGRAM FOR DISPLAYING AN IMAGE IN ACCORDANCE WITH A SELECTION FROM A DISPLAYED MENU AND BASED ON A DETECTION BY A SENSOR

(71) Applicant: SONY CORPORATION, Tokyo (JP)

(72) Inventor: Tatsuki Kashitani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 15/433,672

(22) Filed: Feb. 15, 2017

(65) Prior Publication Data
US 2017/0160885 A1 Jun. 8, 2017

Related U.S. Application Data

(63) Continuation of application No. 15/099,884, filed on Apr. 15, 2016, which is a continuation of application
(Continued)

(30) Foreign Application Priority Data

Mar. 24, 2010 (JP) .................................. 2010-068269
Mar. 24, 2010 (JP) .................................. 2010-068270

(51) Int. Cl.
*G06T 19/00* (2011.01)
*G06T 7/20* (2017.01)
(Continued)

(52) U.S. Cl.
CPC ......... *G06F 3/0482* (2013.01); *G02B 27/017* (2013.01); *G02B 27/0172* (2013.01);
(Continued)

(58) Field of Classification Search
CPC ......... G06T 19/006; G06T 7/73; G06T 7/277; G02B 27/017; G06F 3/011; G06F 3/017; G06F 3/04842; G09G 5/00
See application file for complete search history.

(56) References Cited

U.S. PATENT DOCUMENTS

| | | | | |
|---|---|---|---|---|
| 6,037,936 A | * | 3/2000 | Ellenby .................. | G01C 17/34 348/211.8 |
| 6,067,112 A | * | 5/2000 | Wellner .................. | G06F 3/033 348/136 |

(Continued)

FOREIGN PATENT DOCUMENTS

| | | |
|---|---|---|
| CN | 1696606 A | 11/2005 |
| JP | 2008-304268 | 12/2008 |
| WO | WO 98/11528 | 3/1998 |

OTHER PUBLICATIONS

Recent Advances in Augmented Reality, Azuma et al., 2001, IEEE.*
(Continued)

*Primary Examiner* — Nicholas G Giles
(74) *Attorney, Agent, or Firm* — Xsensus LLP

(57) ABSTRACT

There is provided an image processing device including a superimposition display position determining unit which determines a position of an object having a predetermined flat surface or curved surface out of an object imaged in an input image based on an environment map, a superimposition display image generating unit which generates a superimposition display image by setting superimposition display data at the position of the object determined by the superimposition display position determining unit, an image superimposing unit which superimposes the superimposition display image on a visual field of a user, an operating object recognizing unit which recognizes an operating object imaged in the input image, and a process executing unit which executes a process corresponding to an item selected based on a position of the operating object recognized by the operating object recognizing unit.

11 Claims, 18 Drawing Sheets

Related U.S. Application Data

No. 14/865,756, filed on Sep. 25, 2015, now Pat. No. 9,367,964, which is a continuation of application No. 13/933,873, filed on Jul. 2, 2013, now Pat. No. 9,208,615, which is a continuation of application No. 13/049,433, filed on Mar. 16, 2011, now Pat. No. 8,502,903.

(51) Int. Cl.
| | |
|---|---|
| *G06F 3/01* | (2006.01) |
| *G06F 3/0482* | (2013.01) |
| *G06T 7/73* | (2017.01) |
| *G06T 7/277* | (2017.01) |
| *G02B 27/01* | (2006.01) |
| *G06F 3/047* | (2006.01) |
| *G09G 5/00* | (2006.01) |
| *G06F 3/0484* | (2013.01) |

(52) U.S. Cl.
CPC .............. *G06F 3/011* (2013.01); *G06F 3/012* (2013.01); *G06F 3/017* (2013.01); *G06F 3/04842* (2013.01); *G06T 7/277* (2017.01); *G06T 7/73* (2017.01); *G06T 19/006* (2013.01); *G09G 5/00* (2013.01); *G02B 2027/014* (2013.01); *G02B 2027/0138* (2013.01); *G02B 2027/0141* (2013.01); *G02B 2027/0187* (2013.01)

(56) References Cited

U.S. PATENT DOCUMENTS

| | | | | |
|---|---|---|---|---|
| 6,690,357 B1* | 2/2004 | Dunton | ................. | G06F 1/1616 345/157 |
| 6,771,294 B1 | 8/2004 | Pulli et al. | | |
| 7,248,285 B2* | 7/2007 | Needham | .......... | G06F 17/30265 348/207.1 |
| 7,508,978 B1* | 3/2009 | Lefevere | ............ | G01B 11/2545 345/419 |
| 7,576,727 B2 | 8/2009 | Bell | | |
| 7,680,324 B2 | 3/2010 | Boncyk et al. | | |
| 7,812,860 B2* | 10/2010 | King | ................. | G06F 17/30011 348/210.99 |
| 7,986,843 B2* | 7/2011 | Chaudhury | .......... | G06K 9/6857 382/229 |
| 8,004,571 B2 | 8/2011 | Yamashita | | |
| 8,026,931 B2* | 9/2011 | Sun | ......................... | G06T 11/00 345/632 |
| 8,286,096 B2 | 10/2012 | Shibaike | | |
| 8,312,017 B2* | 11/2012 | Martin | .............. | G06F 17/30867 707/722 |
| 8,502,903 B2 | 8/2013 | Kashitani | | |
| 2002/0102966 A1* | 8/2002 | Lev | ............ | G09F 3/00 455/412.1 |
| 2003/0164819 A1* | 9/2003 | Waibel | ................. | G06F 1/1626 345/173 |
| 2004/0113885 A1* | 6/2004 | Genc | ...................... | G06F 3/011 345/156 |
| 2004/0179107 A1* | 9/2004 | Benton | ................... | G01C 21/20 348/211.99 |
| 2004/0183775 A1* | 9/2004 | Bell | ....................... | G06F 3/011 345/156 |
| 2004/0208372 A1* | 10/2004 | Boncyk | ............ | G06F 17/30256 382/181 |
| 2005/0185060 A1* | 8/2005 | Neven, Sr. | ........ | G06F 17/30244 348/211.2 |
| 2005/0256391 A1 | 11/2005 | Satoh et al. | | |
| 2006/0002607 A1* | 1/2006 | Boncyk | ............ | G06F 17/30247 382/165 |
| 2006/0192782 A1* | 8/2006 | Hildreth | .................. | A63F 13/00 345/473 |
| 2006/0240862 A1* | 10/2006 | Neven | ..................... | G06K 9/228 455/550.1 |
| 2006/0251334 A1* | 11/2006 | Oba | ..................... | A61B 5/1122 382/275 |
| 2006/0262188 A1* | 11/2006 | Elyada | ...................... | G06T 7/97 348/143 |
| 2008/0279481 A1* | 11/2008 | Ando | ................. | G06F 17/30277 382/306 |
| 2008/0304707 A1 | 12/2008 | Kenichiro et al. | | |
| 2009/0096909 A1* | 4/2009 | Yamashita | ............. | H04N 7/181 348/333.01 |
| 2009/0285484 A1* | 11/2009 | Mallinson | ................ | A63F 13/02 382/183 |
| 2010/0199232 A1* | 8/2010 | Mistry | .................... | G06F 1/163 715/863 |
| 2011/0130159 A1* | 6/2011 | Chen | ..................... | G06F 3/0317 455/466 |
| 2011/0205341 A1 | 8/2011 | Wilson | | |
| 2011/0234879 A1* | 9/2011 | Kashitani | ................ | G06F 3/011 348/333.02 |
| 2013/0293583 A1 | 11/2013 | Kashitani | | |

OTHER PUBLICATIONS

Andrew J. Davison, "Real-Time Simultaneous Localization and Mapping with a Single Camera". Proceedings of the 9th IEEE International Conference on Computer Vision vol. 2, 2003, pp. 1-8.
Combined Office Action and Search Report dated Oct. 29, 2014 in Chinese Patent Application No. 201110069689.X (with English translation).

\* cited by examiner

FIG.11

| SUPERIMPOSITION DISPLAY DATA | ITEM POSITIONAL INFORMATION 1 | PROCESS CONTENT 1 | ITEM POSITIONAL INFORMATION 2 | PROCESS CONTENT 2 | ... |
|---|---|---|---|---|---|
| SUPERIMPOSITION DISPLAY DATA CD1 | (20, 40) | EXECUTE APPLICATION AP1 | (20, 50) | DISPLAY SUPERIMPOSITION DISPLAY DATA CD2 | ... |
| SUPERIMPOSITION DISPLAY DATA CD2 | (30, 30) | EXECUTE APPLICATION AP2 | — | — | ... |
| ... | ... | ... | ... | ... | ... |

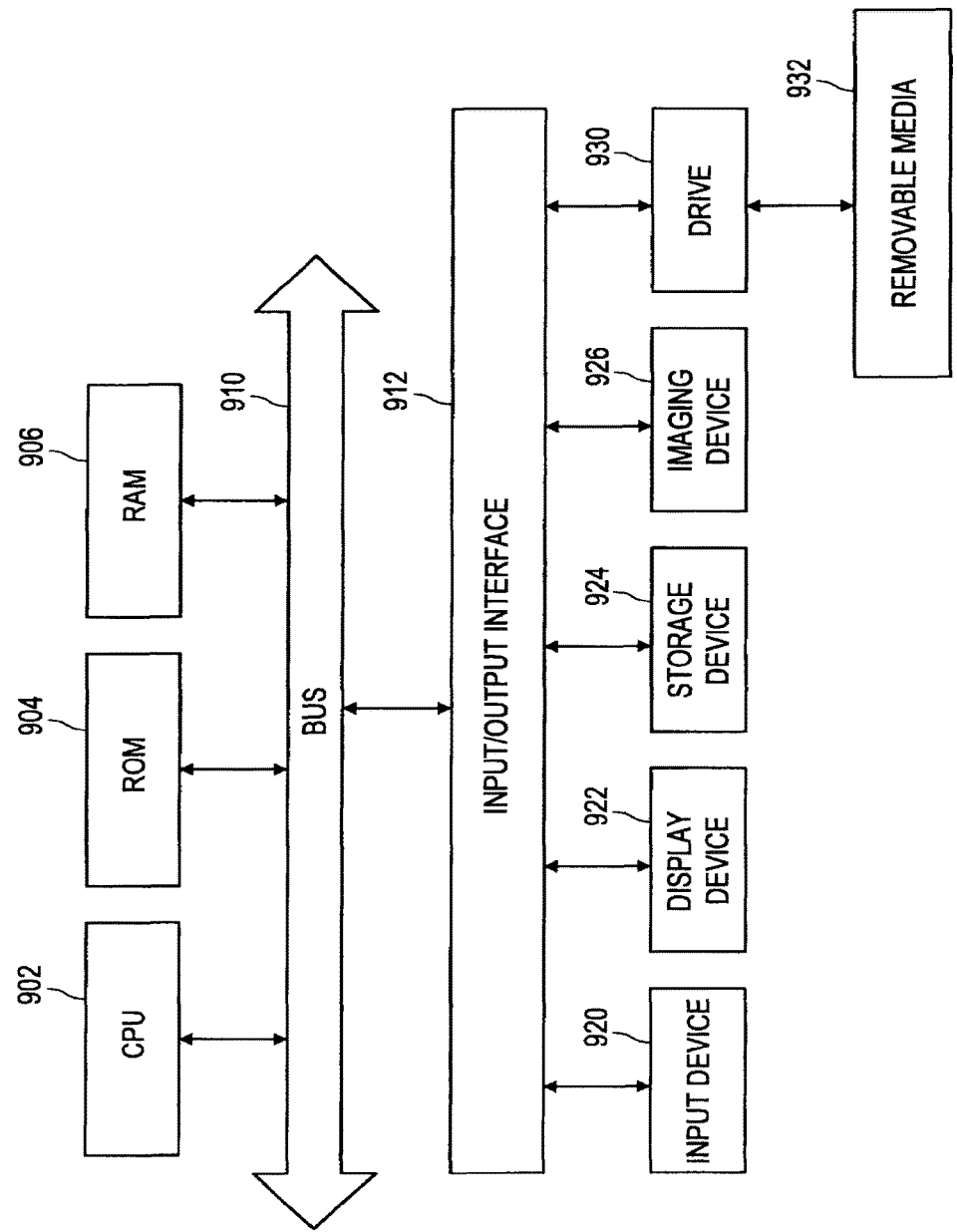

IMAGE PROCESSING DEVICE, IMAGE PROCESSING METHOD, AND PROGRAM FOR DISPLAYING AN IMAGE IN ACCORDANCE WITH A SELECTION FROM A DISPLAYED MENU AND BASED ON A DETECTION BY A SENSOR

CROSS-REFERENCE TO RELATED APPLICATION

The present continuation application claims the benefit of priority under 35 U.S.C. § 120 to U.S. application Ser. No. 15/099,884, filed Apr. 15, 2016, which is a continuation of U.S. application Ser. No. 14/865,756, filed Sep. 25, 2015, now U.S. Pat. No. 9,367,964, which is a continuation of U.S. application Ser. No. 13/933,873, filed on Jul. 2, 2013, now U.S. Pat. No. 9,208,615, which is a continuation of U.S. application Ser. No. 13/049,433, filed Mar. 16, 2011, now U.S. Pat. No. 8,502,903, and claims priority to Japanese Application Nos. 2010-068269, filed Mar. 24, 2010 and 2010-068270, filed Mar. 24, 2010. The above-noted documents are hereby incorporated by reference in their entirety.

BACKGROUND OF THE INVENTION

Field of the Invention

The present invention relates to an image processing device, an image processing method, and a program.

Description of the Related Art

Recently, technology referred to as augmented reality (AR) has been drawing attention whereby an image obtained by imaging a real space and modified through a specific process is presented to a user. In the AR technology, useful information on an object in a real space shown in an input image may be inserted into the image to be output as an output image, for example. That is, in the AR technology, typically, a large part of the image presented to the user shows the real space, and some part of the image may be processed in accordance with an application purpose. Such a characteristic is in contrast to virtual reality in which an entire (or a large part) of the output image is composed using computer graphics (CG). By using the AR technology, for example, advantages such as easy understanding of a situation of the real space by a user or work support based on the output image may be provided.

Further, in the AR technology, in addition to the technique involving inserting useful information on an object in a real space into an image obtained by imaging a real space, there is also a technique of presenting to a user useful information on an object in a real space in a superimposing manner on a visual field of a user who is viewing the real space. In this technique, the useful information on an object in the real space is presented to the user by being optically composited with the visual field of the user who is viewing the real space by using a half mirror and the like. Also in the case of using such AR technology, for example, advantages such as easy understanding of a situation of the real space by a user or work support may be provided.

In the AR technology, in order to present really useful information to the user, it is important that a computer accurately understands the situation of the real space. Therefore, technology aimed to understand the situation of the real space, which serves as a basis of the AR technology, has been developed. For example, Japanese Patent Application Laid-Open No. 2008-304268 discloses a method of dynamically generating an environment map representing a three-dimensional positions of objects existing in a real space by applying technology referred to as simultaneous localization and mapping (SLAM) capable of simultaneously estimating a position and posture of a camera and a position of a feature point shown in an image of the camera. Note that, a basic principle of the SLAM technology using a monocular camera is disclosed in "Real-Time Simultaneous Localization and Mapping with a Single Camera" (Andrew J. Davison, Proceedings of the 9th IEEE International Conference on Computer Vision Volume 2, 2003, pp. 1403-1410).

SUMMARY OF THE INVENTION

In the meantime, as a compact display device to be mounted on the head, a head mounted display (HMD) has been in widespread use. As a technology that uses an HMD equipped with a camera, there can be exemplified a technology for modifying an image imaged by the camera through the AR technology using an image processing device, and displaying the image modified by the HMD in order for a user to view the modified image. A function which such an HMD has may be realized by a video transmissive HMD, for example. Further, for example, there is also a technology for generating an additional information image using an image imaged by the camera as a source through the AR technology by an image processing device, and optically compositing the generated additional information image using a half mirror and the like within a visual field, in order for a user to view the image. Such functions of the HMD may be realized by an optically transmissive HMD, for example. By using those technologies, the user can easily understand a situation of the real space and a work support based on the output image may be provided. As a device for inputting operation for causing the image processing device to execute a process, there may be assumed an input device such as a keyboard or a mouse, for example.

However, while there is exemplified as an advantage in using the HMD that the trouble of inputting operation by the user can be saved, there is an issue that when the input device such as a keyboard or a mouse is used as a device for inputting operation, it causes a trouble of inputting operation to the user. Thus, the advantage of using the HMD is lessened.

In light of the foregoing, it is desirable to provide an image processing device, an image processing method, and a program which are novel and improved, and which can facilitate the input of operation by the user in the configuration in which information is displayed, by the HMD, in a superimposed manner on a visual field of the user through the AR technology.

According to an embodiment of the present invention, there is provided an image processing device which includes a feature data storage unit which stores feature data indicating a feature of appearance of an object, a superimposition display data storage unit which stores superimposition display data which is to be a source of an image that is superimposed on a visual field of a user and an item position which is a position of an item forming the superimposition display data, an environment map generating unit which generates an environment map representing a position of one or more objects existing in a real space based on an input image obtained by imaging the real space using an imaging device and the feature data stored in the feature data storage unit, a superimposition display position determining unit which determines a position of an object having a predetermined flat surface or curved surface out of an object imaged in the input image based on the environment map, a superimposition display image generating unit which generates a superimposition display image by setting the superimposition display data at the position of the object determined by the superimposition display position determining unit, an image superimposing unit which superimposes the superimposition display image on the visual field of the user, an operating object recognizing unit which recognizes an operating object imaged in the input image, and a process executing unit which executes a process corresponding to the item selected based on a position of the operating object recognized by the operating object recognizing unit.

The operating object recognizing unit may recognize a foot imaged in the input image as the operating object.

The operating object recognizing unit may perform matching between a shoe registration image which is an image of a shoe which has been registered in advance and the input image, and when the operating object recognizing unit determines that a shoe which matches with the shoes in the shoe registration image is imaged in the input image, the operating object recognizing unit may recognize the shoe as the operating object.

When a user wears the imaging device on his/her head, the operating object recognizing unit may determine whether or not a foot imaged in the input image is coming in from a side which is the nearest from the user among respective sides that form the input image, and when the operating object recognizing unit determines that the foot is coming in from the side which is the nearest from the user, the operating object recognizing unit may recognize the foot as the operating object.

The operating object recognizing unit may determine whether or not a shoe with a mark, which has been subjected to predetermined marking in advance, is imaged in the input image, and when the operating object recognizing unit determines that the shoe with a mark is imaged in the input image, the operating object recognizing unit may recognize the shoe as the operating object.

The process executing unit may determine whether or not a contact is detected by a contact sensor attached to the foot, and when the contact is detected by the contact sensor, the process executing unit may execute a process corresponding to the item selected based on a position of the foot.

The process executing unit may determine whether or not the operating object recognized by the operating object recognizing unit has stopped at substantially the same position for a predetermined time period, and when the process executing unit determines that the operating object has stopped at substantially the same position for the predetermined time period, the process executing unit may execute a process corresponding to the item selected based on a position of the operating object.

The superimposition display data storage unit may store other superimposition display data which is displayed subsequently to the superimposition display data. When the item is selected by the process executing unit, the superimposition display image generating unit may generate a new superimposition display image by further setting the other superimposition display data. When the item is selected by the process executing unit, the image superimposing unit may further superimpose the other superimposition display data on the new superimposition display image.

The operating object recognizing unit may recognize a hand imaged in the input image as the operating object.

The image superimposing unit may superimpose the superimposition display image on the visual field of the user and may cause a display unit to display the superimposition display image.

When the image superimposing unit detects, by using a sensor which detects the gradient of the imaging device, that a user wearing the imaging device on his/her head tilts the head in a downward direction at a gradient exceeding a predetermined value, the image superimposing unit may cause the display unit to display the superimposition display image, and when the image superimposing unit does not detect that a user wearing the imaging device on his/her head tilts the head in a downward direction at a gradient exceeding the predetermined value by using the sensor which detects the gradient of the imaging device, the image superimposing unit may restrict displaying the superimposition display image, the display being performed by the display unit.

The superimposition display position determining unit may determine, as the position of the object having the predetermined flat surface or curved surface, a position of an object having a flat surface that extends in a substantially horizontal direction.

The image processing device may further include a position estimating unit which estimates a position of a floor surface or a wall surface in the real space based on a position of a point on a surface of the object represented by the environment map. The superimposition display position determining unit may determine the position of the floor surface as the position of the object further based on the position of the floor surface or the wall surface estimated by the position estimating unit.

The feature data may include data indicating, for one or more points on the surface of each object, whether each point is likely to come in contact with the floor surface or the wall surface in the real space. The position estimating unit may estimate the position of the floor surface or the wall surface in the real space further based on the feature data.

Further, according to another embodiment of the present invention, there is provided an image processing method performed by an image processing device which includes a feature data storage unit which stores feature data indicating a feature of appearance of an object, a superimposition display data storage unit which stores superimposition display data which is to be a source of an image that is superimposed on a visual field of a user and an item position which is a position of an item forming the superimposition display data, an environment map generating unit, a superimposition display position determining unit, an image superimposing unit, an operating object recognizing unit, and a process executing unit, the image processing method including the steps of generating, by the environment map generating unit, an environment map representing a position of one or more objects existing in a real space based on an input image obtained by imaging the real space using an imaging device and the feature data stored in the feature data storage unit, determining, by the superimposition display position determining unit, a position of an object having a predetermined flat surface or curved surface out of an object imaged in the input image based on the environment map, generating, by the superimposition display image generating unit, a superimposition display image by setting the superimposition display data at the position of the object determined by the superimposition display position determining unit, superimposing, by the image superimposing unit, the superimposition display image on the visual field of the user, recognizing, by the operating object recognizing unit, an operating object imaged in the input image, and executing, by the process executing unit, a process corresponding to the item selected based on a position of the operating object recognized by the operating object recognizing unit.

Further, according to another embodiment of the present invention, there is provided a program for causing a computer to function as an image processing device which includes a feature data storage unit which stores feature data indicating a feature of appearance of an object, a superimposition display data storage unit which stores superimposition display data which is to be a source of an image that is superimposed on a visual field of a user and an item position which is a position of an item forming the superimposition display data, an environment map generating unit which generates an environment map representing a position of one or more objects existing in a real space based on an input image obtained by imaging the real space using an imaging device and the feature data stored in the feature data storage unit, a superimposition display position determining unit which determines a position of an object having a predetermined flat surface or curved surface out of an object imaged in the input image based on the environment map, a superimposition display image generating unit which generates a superimposition display image by setting the superimposition display data at the position of the object determined by the superimposition display position determining unit, an image superimposing unit which superimposes the superimposition display image on the visual field of the user, an operating object recognizing unit which recognizes an operating object imaged in the input image, and a process executing unit which executes a process corresponding to the item selected based on a position of the operating object recognized by the operating object recognizing unit.

According to the image processing device, the image processing method, and the program of the present embodiments described above, it is possible to facilitate the input of operation by the user in the configuration in which information is displayed, by the HMD, in a superimposed manner on a visual field of the user through the AR technology.

BRIEF DESCRIPTION OF THE DRAWINGS

FIG. 11 is a diagram illustrating an example of data stored in a superimposition display data storage unit according to the first embodiment;

FIG. 17 is a block diagram illustrating an example of a hardware configuration of a general-purpose computer.

DETAILED DESCRIPTION OF THE EMBODIMENTS

Figure 1:
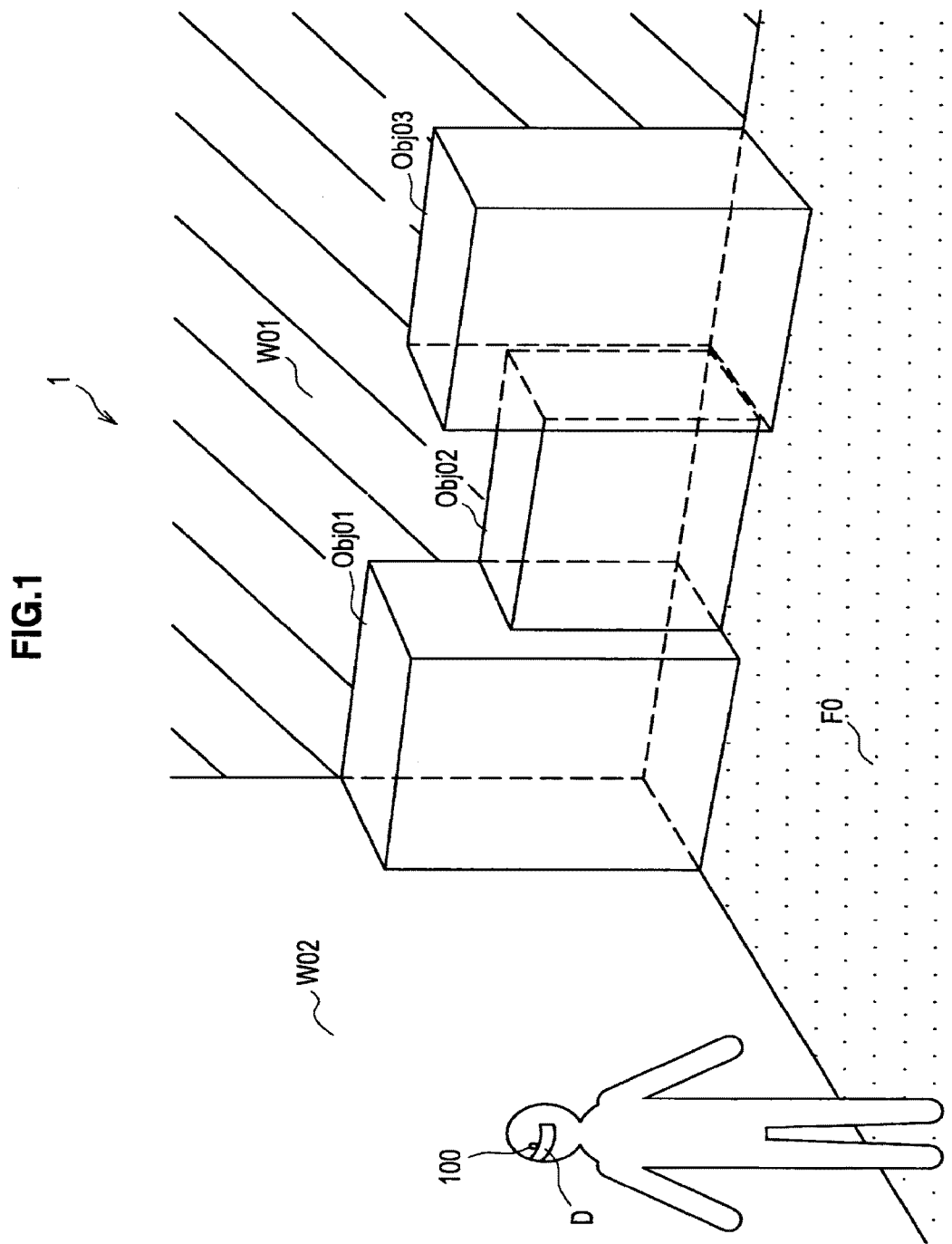
FIG. 1 is a schematic diagram for illustrating an image processing device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, the "detailed description of the embodiments" is described in the following order.

1. Overview of Image Processing Device according to an Embodiment
2. First Embodiment
2-1. Imaging Unit
2-2. Environment Map Generating Unit
2-3. Output Image Generating Unit
2-4. Summary of First Embodiment
3. Second Embodiment
3-1. Environment Map Generating Unit
3-2. Output Image Generating Unit
3-3. Summary of Second Embodiment
4. Hardware Configuration 1. Overview of Image Processing Device According to an Embodiment FIG. 1 is a schematic diagram for illustrating an image processing device according to an embodiment of the present invention. FIG. 1 illustrates an environment 1 according to an embodiment of the present invention in which a user is present who wears an image processing device 100 on his/her head.

With reference to FIG. 1, there are three objects Obj01, Obj02, and Obj03, wall surfaces W01 and W02 and a floor surface F0 inside the environment 1. The object Obj01 is placed on a corner between the wall surfaces W01 and W02. Further, the object Obj02 is placed next to the object Obj01 and the object Obj03 is placed next to the object Obj02 along the wall surface W01. In the case where the environment 1 is a room of a house, the objects Obj01, Obj02, and Obj03 correspond to pieces of furniture such as a drawer, for example.

The image processing device 100 images inside the environment 1, which is a real space, and executes image processing according to this embodiment to be described later. Although there is illustrated, as an example of the image processing device 100 in FIG. 1, a device which is equipped with a camera mounted on the head of the user and which modifies an image imaged by the camera and outputs the image to a display device D such as a head mounted display (HMD), the image processing device 100 is not limited to such an example. For example, the image processing device 100 may be an information processing device such as a personal computer (PC), a mobile terminal, or a digital household electrical appliance capable of obtaining an image from an imaging device such as the video camera. Also, the image processing device 100 does not necessarily incorporate therein the camera mounted on the head of the user. That is, the camera is necessarily held by the user, but the configuration other than the camera included in the image processing device 100 is not necessarily held by the user as illustrated in FIG. 1. Further, the environment 1 is not limited to the example illustrated in FIG. 1, and may be an indoor environment or an outdoor environment.

Figure 2:
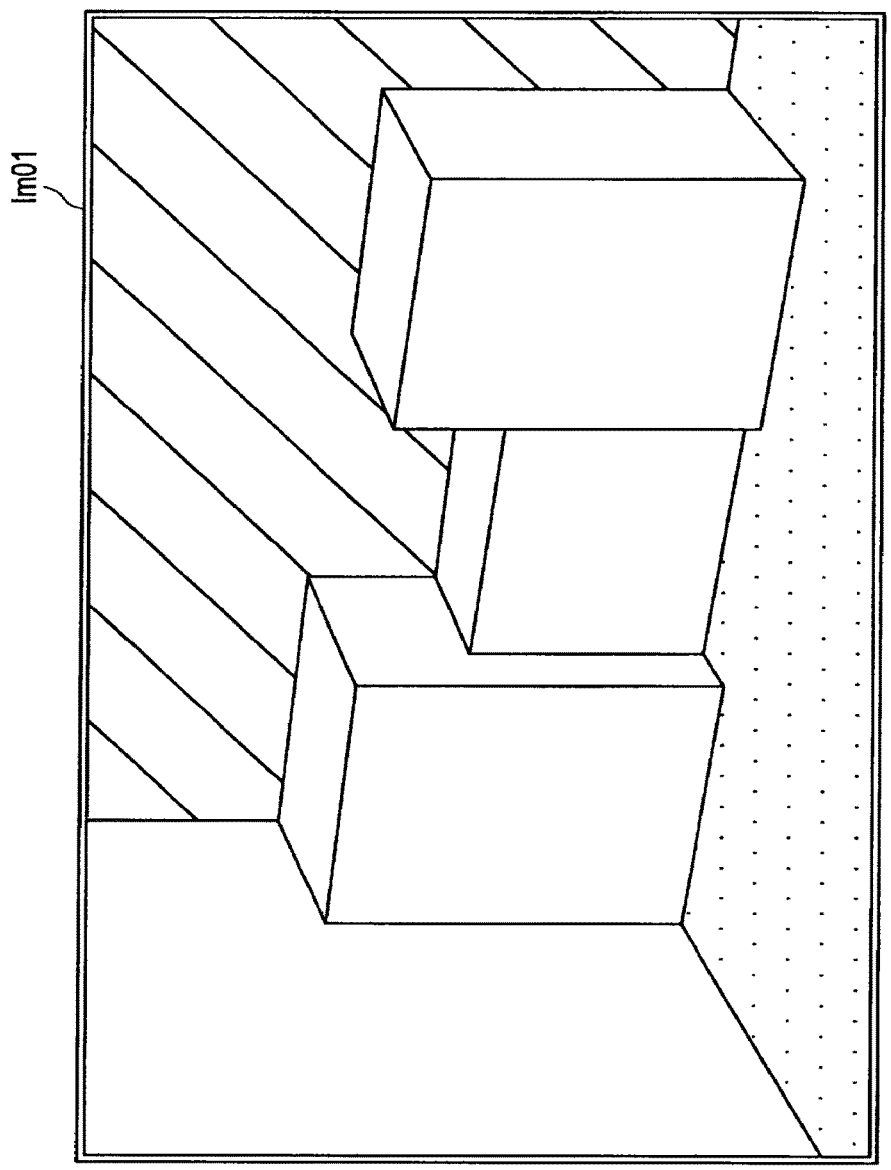
FIG. 2 is an illustrative diagram illustrating an example of an input image for image processing according to an embodiment.

FIG. 2 illustrates an input image Im01 as an example imaged by the image processing device 100 in the environment 1 in FIG. 1. The three objects Obj01, Obj02 and Obj03, the wall surfaces W01 and W02, and the floor surface F0 illustrated in FIG. 1 are present in the input image Im01. The image processing device 100 obtains such input image, for example, and generates an output image obtained by superimposing data (hereinafter, referred to as "superimposition display data"), which is not directly dependent on an object imaged in the input image, on the input image. As examples of the superimposition display data, there can be assumed data such as menu, advertisement, schedule, and memo.

It is general that there is an object such as a building being imaged in the vicinity of the front face of the input image, and according to this reason, it is general that, in the vicinity of the front face of the output image displayed on the display device D, information on an object such as information on a building is displayed in a superimposed manner. Therefore, when the superimposition display data is displayed in a superimposed manner in the vicinity of the front face of a shot image, there may occur a case where the superimposition display data and the information on the object imaged in the taken image are overlapped or close to each other. When such a case occurs, it becomes difficult for a user to view the output image obtained by superimposing the superimposition display data on the input image. In this specification, a detailed description will be made on a technology that, in order to make it easier to view the output image obtained by superimposing the superimposition display data on the input image, a position of a floor surface from the input image is recognized, and the superimposition display data is superimposed on the position of the floor surface in the input image, for example. Since the floor surface is present all over the place and it is less likely that the information on the object is superimposed on the floor surface, the situation that it becomes difficult to view the output image can be improved.

Further, there is exemplified as an advantage in using the HMD that the trouble of inputting operation by the user can be saved, but when the input device such as a keyboard or a mouse is used as a device for inputting operation, it causes a trouble of inputting operation on the user. Thus, the advantage of using the HMD is lessened. In this specification, in order to enable the user to easily select a process that the user wants the image processing device 100 to execute, a detailed description will be made on a technology that, when the user positions his/her foot on a position of a desired item while viewing superimposition display data, the image processing device 100 executes the process corresponding to the item at which the foot positions based on the input image, for example. According to such a technology, the trouble of inputting operation by the user can be saved.

Further, such a technology can be applied to an image processing device 100 which displays superimposition display data in a superimposed manner on actual space by optically compositing the superimposition display data within the visual field of the user. It goes without saying that also in such a case, the effect that it becomes easier for the user to view the composite image and the effect that the trouble of inputting operation by the user can be saved are achieved. Hereinafter, a description will be made by taking as an example an image processing device which displays an output image obtained by superimposing superimposition display data on an input image.

2. First Embodiment

Figure 3:
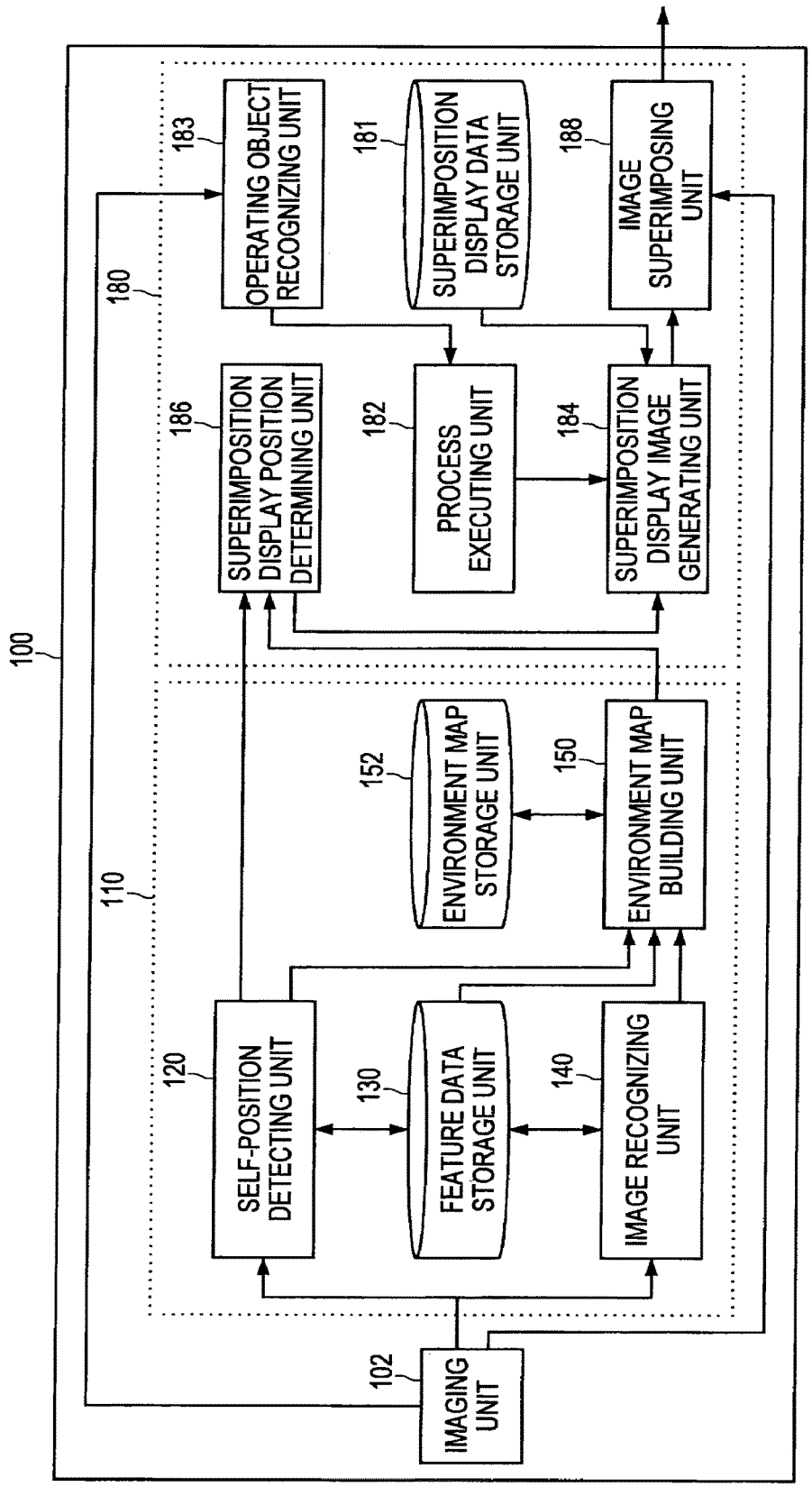
FIG. 3 is a block diagram illustrating an example of a configuration of an image processing device according to a first embodiment.

FIG. 3 is a block diagram illustrating an example of a configuration of the image processing device 100 according to the first embodiment. With reference to FIG. 3, the image processing device 100 includes an imaging unit 102, an environment map generating unit 110, and an output image generating unit 180.

2-1. Imaging Unit

The imaging unit 102 may be realized as an imaging device having an imaging element such as a charge coupled device (CCD) or a complementary metal oxide semiconductor (CMOS), for example. Although the imaging unit 102 is composed as a part of the image processing device 100 in this embodiment, the imaging unit 102 may be provided outside the image processing device 100. The imaging unit 102 outputs an image generated by imaging the real space such as the environment 1 illustrated in FIG. 1 to the environment map generating unit 110 and the output image generating unit 180 as the input image.

2-2. Environment Map Generating Unit

The environment map generating unit 110 generates an environment map, which represents positions of one or more objects present in the real space and the like based on the input image input from the imaging unit 102 and feature data of an object to be described later stored in a feature data storage unit 130. As illustrated in FIG. 3, in this embodiment, the environment map generating unit 110 includes a self-position detecting unit 120, the feature data storage unit 130, an image recognizing unit 140, an environment map building unit 150, and an environment map storage unit 152.

(1) Self-Position Detecting Unit

The self-position detecting unit 120 dynamically detects a position of the imaging device, which takes the input image, based on the input image input from the imaging unit 102 and the feature data stored in the feature data storage unit 130. For example, also in the case where the imaging device has a monocular camera, the self-position detecting unit 120 may dynamically determine a position and posture of the camera and a position of a feature point on an imaging plane of the camera for each frame by applying the SLAM technology described in "Real-Time Simultaneous Localization and Mapping with a Single Camera" (Andrew J. Davison, Proceedings of the 9th IEEE International Conference on Computer Vision Volume 2, 2003, pp. 1403-1410).

First, entire flow of a self-position detection process by the self-position detecting unit 120 to which the SLAM technology is applied is described with reference to FIG. 4. Next, the self-position detection process is described in detail with reference to FIGS. 5 to 7.

Figure 4:
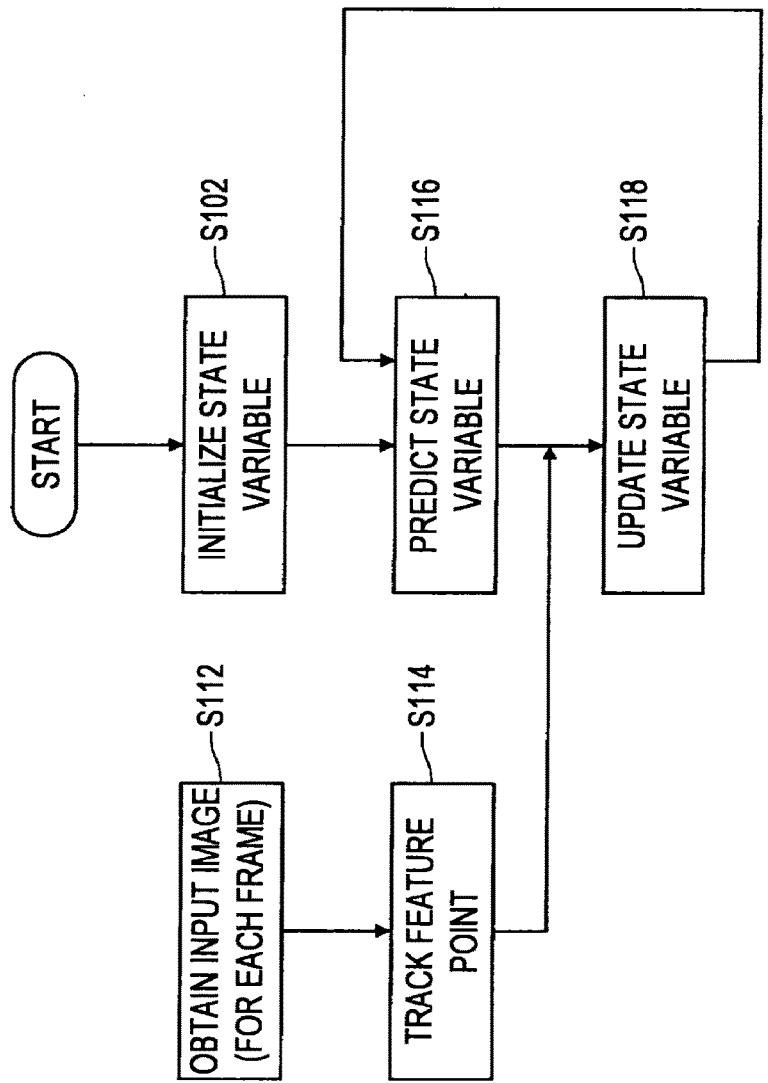
FIG. 4 is a flowchart illustrating an example of a flow of a self-position detection process according to the first embodiment.

FIG. 4 is a flowchart illustrating an example of the flow of the self-position detection process by the self-position detecting unit 120 to which the SLAM technology is applied. In FIG. 4, when the self-position detection process starts, the self-position detecting unit 120 first initializes a state variable (Step S102). In this embodiment, the state variable is a vector including the position and the posture (rotation angle) of the camera, a moving speed and an angular speed of the camera and the position of one or more feature points as an element. The self-position detecting unit 120 then sequentially obtains the input image from the imaging unit 102 (Step S112). The processes from Step S112 to Step S118 may be repeated for each input image (that is, each frame).

At Step S114, the self-position detecting unit 120 tracks feature points present in the input image. For example, the self-position detecting unit 120 detects a patch (small image of 3×3=9 pixels around a feature point, for example) of each feature point stored in advance in the feature data storage unit 130 from the input image. The position of the patch herein detected, that is, the position of the feature point is used later when updating the state variable.

At Step S116, the self-position detecting unit 120 generates a predicted value of the state variable of next frame, for example, based on a predetermined prediction model. Also, at Step S118, the self-position detecting unit 120 updates the state variable using the predicted value of the state variable generated at Step S116 and an observed value according to the position of the feature point detected at Step S114. The self-position detecting unit 120 executes the processes at Steps S116 and S118 based on a principle of an extended Kalman filter.

As a result of such process, a value of the state variable updated for each frame is output. Contents of respective processes of tracking of the feature point (Step S114), prediction of the state variable (Step S116) and updating of the state variable (Step S118) are hereinafter described more specifically.

(1-1) Tracking of Feature Point

In this embodiment, the feature data storage unit 130 stores in advance the feature data indicating features of objects corresponding to physical objects which may be present in the real space. The feature data includes small images, that is, the patches regarding one or more feature points, each representing the feature of appearance of each object, for example. The patch may be the small image composed of 3×3=9 pixels around the feature point, for example.

Figure 5:
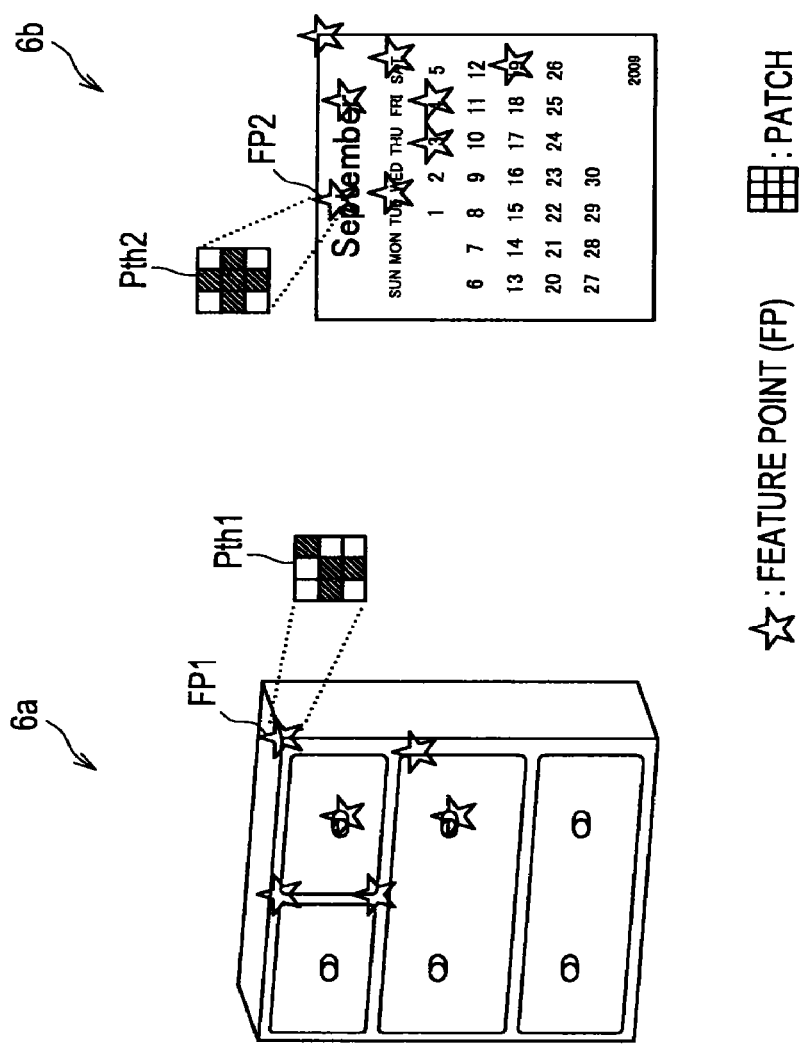
FIG. 5 is an illustrative diagram for illustrating a feature point set on an object.

FIG. 5 illustrates two examples of the objects and an example of feature points (FPs) and patches set on each object. A left object in FIG. 5 is the object representing the drawer (refer to 6*a*). A plurality of feature points including a feature point FP1 are set on the object. Further, a patch Pth1 is defined in relation to the feature point FP1. On the other hand, a right object in FIG. 5 is the object representing a calendar (refer to 6*b*). A plurality of feature points including a feature point FP2 are set on the object. Further, a patch Pth2 is defined in relation to the feature point FP2.

Figure 6:
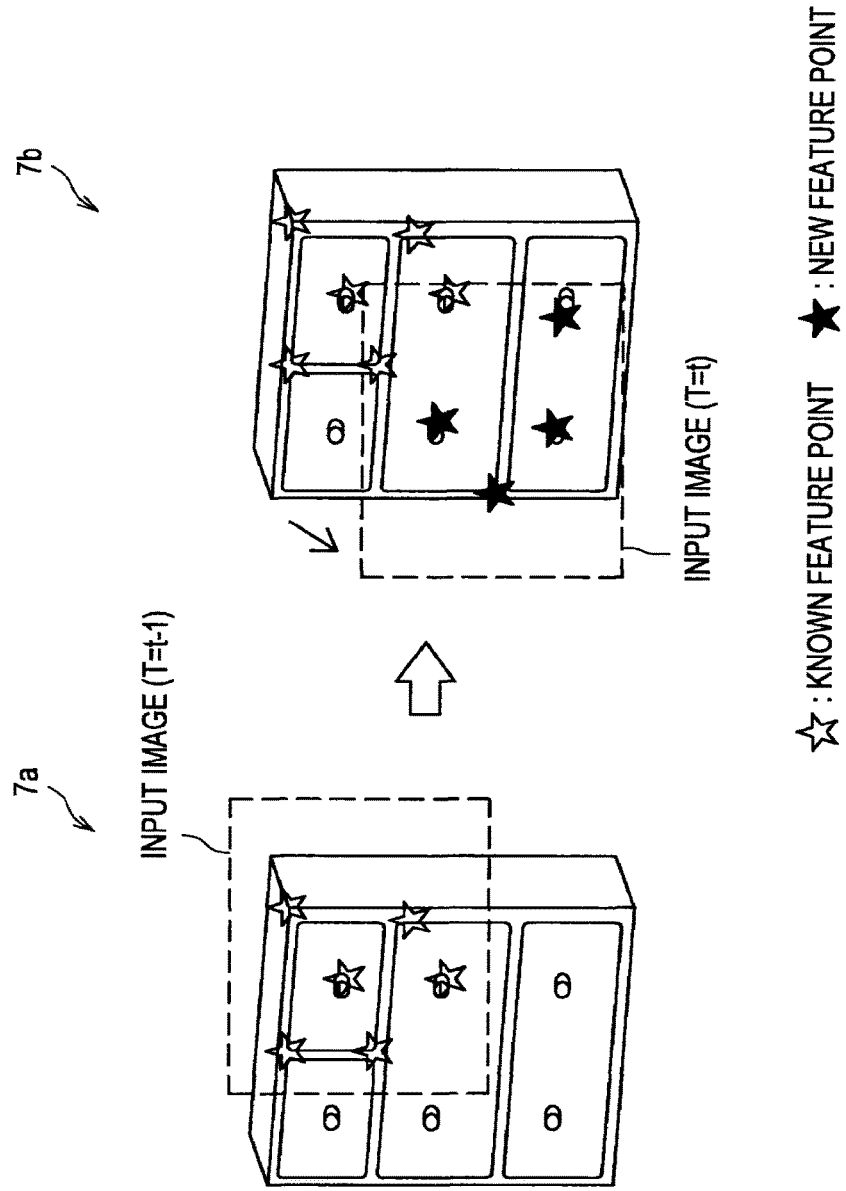
FIG. 6 is an illustrative diagram for illustrating addition of the feature point.
Figure 7:
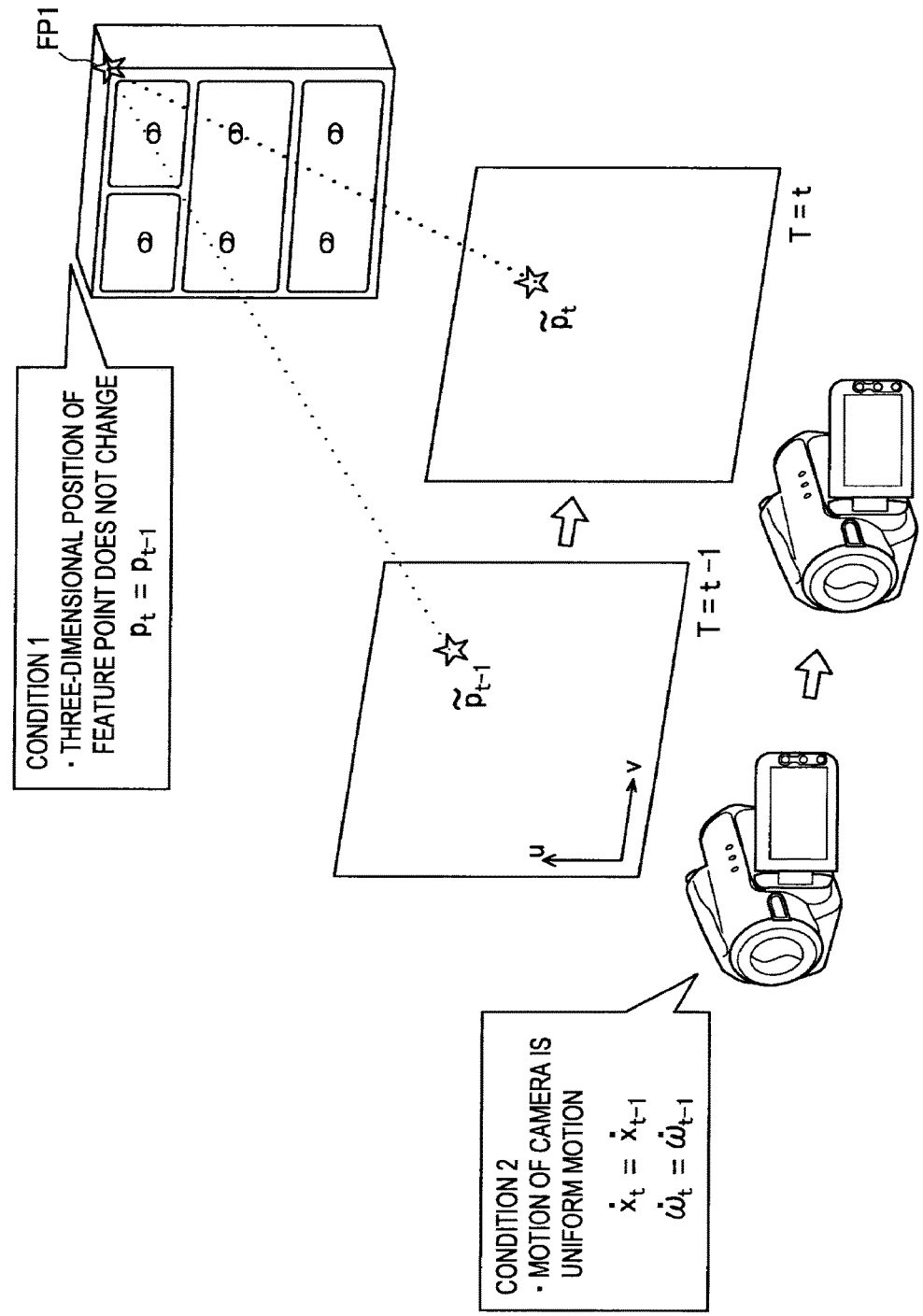
FIG. 7 is an illustrative diagram for illustrating an example of a prediction model.

Upon obtaining an input image from the imaging unit 102, the self-position detecting unit 120 matches partial images included in the input image against the patch for each feature point illustrated in FIG. 6 stored in advance in the feature data storage unit 130. The self-position detecting unit 120 then specifies a position of each feature point included in the input image (a position of a center pixel of the detected patch, for example) as a result of the matching.

It should be noted that, for tracking feature points (Step S114 in FIG. 4), it is not necessary to store data regarding all of the feature points to be tracked in the feature data storage unit 130 in advance. For example, six feature points are detected in the input image at time T=t−1 in an example illustrated in FIG. 6 (refer to 7*a*). Next, when the position or the posture of the camera changes at time T=t, only two of the six feature points present in the input image at the time T=t−1 are present in the input image. In this case, the self-position detecting unit 120 may newly set feature points at positions where a characteristic pixel pattern of the input image is present and use the new feature points in the self-position detection process for a subsequent frame. For example, in the example illustrated in FIG. 6, four new feature points are set on the object at the time T=t (refer to 7*b*). This is a feature of the SLAM technology, and according to this, a cost of setting all of the feature points in advance may be reduced and accuracy of the process may be improved using the increased number of feature points.

(1-2) Prediction of State Variable

In this embodiment, the self-position detecting unit 120 uses a state variable X expressed in the following equation as the state variable to be applied for the extended Kalman filter.

[Equation 1]

$$X = \begin{pmatrix} x \\ \omega \\ \dot{x} \\ \dot{\omega} \\ p_1 \\ \vdots \\ p_N \end{pmatrix} \quad (1)$$

The first element of the state variable X in the equation (1) represents a three-dimensional position of the camera in a global coordinate system (x, y, z) being a coordinate system set in the real space, as expressed in the following equation.

[Equation 2]

$$x = \begin{pmatrix} x_c \\ y_c \\ z_c \end{pmatrix} \quad (2)$$

Also, the second element of the state variable is a four-dimensional vector w having a quaternion as an element corresponding to a rotation matrix representing the posture of the camera. Note that, the posture of the camera may be represented using an Euler angle in place of the quaternion. Also, the third and the fourth elements of the state variable represent the moving speed and the angular speed of the camera, respectively.

Further, the fifth and subsequent elements of the state variable represent a three-dimensional position $p_i$ of a feature point $FP_i$ (i=1 . . . N) in the global coordinate system as expressed in the following equation. Note that, as described above, the number N of the feature points may change during the process.

[Equation 3]

$$p_i = \begin{pmatrix} x_i \\ y_i \\ z_i \end{pmatrix} \quad (3)$$

The self-position detecting unit 120 generates the predicted value of the state variable for a latest frame based on the value of the state variable X initialized at Step S102 or the value of the state variable X updated in a previous frame. The predicted value of the state variable is generated according to a state equation of the extended Kalman filter according to multidimensional normal distribution as shown in the following equation.

[Equation 4]

$$\text{Predicted state variable } \hat{X} = F(X,a) + w \quad (4)$$

Herein, F represents the prediction model regarding state transition of a system and "a" represents a prediction condition. Also, w represents Gaussian noise and may include a model approximation error, an observation error, and the like, for example. In general, an average of the Gaussian noise w is 0.

FIG. 6 is an illustrative diagram for illustrating an example of the prediction model according to this embodiment. With reference to FIG. 6, two prediction conditions in the prediction model according to this embodiment are illustrated. First, as a first condition, suppose that the three-dimensional position of the feature point in the global coordinate system does not change. That is, provided that the three-dimensional position of the feature point FP1 at the time T is $p_T$, the following relationship is satisfied.

[Equation 5]

$$p_t = p_{t-1} \quad (5)$$

Next, as a second condition, suppose that motion of the camera is uniform motion. That is, the following relationship is satisfied for the speed and the angular speed of the camera from the time T=t−1 to the time T=t.

[Equation 6]

$$\dot{X}_t = \dot{X}_{t-1} \quad (6)$$

$$\dot{\omega}_t = \dot{\omega}_{t-1} \quad (7)$$

The self-position detecting unit 120 generates the predicted value of the state variable for the latest frame based on such prediction model and the state equation expressed in the equation (4).

(1-3) Updating of State Variable

The self-position detecting unit 120 then evaluates an error between observation information predicted from the predicted value of the state variable and actual observation information obtained as a result of feature point tracking, using an observation equation, for example. Note that, v in the equation (8) is the error.

[Equation 7]

$$\text{Observation information } s = H(\hat{X}) + v \quad (8)$$

$$\text{Predicted observation information } \hat{s} = H(\hat{X}) \quad (9)$$

Herein, H represents an observation model. For example, a position of the feature point $FP_i$ on the imaging plane (u-v plane) is defined as expressed in the following equation.

[Equation 8]

$$\text{Position of } FP_i \text{ on imaging plane } \tilde{p}_i = \begin{pmatrix} u_i \\ v_i \\ 1 \end{pmatrix} \quad (10)$$

Herein, all of the position of the camera x, the posture of the camera $\omega$, and the three-dimensional position $p_i$ of the feature point $FP_i$ are given as the elements of the state variable X. Then, the position of the feature point $FP_i$ on the imaging plane is derived using the following equation according to a pinhole model.

[Equation 9]

$$\lambda \tilde{p}_i = AR_\omega(p_i - x) \quad (11)$$

Herein, $\lambda$, represents a parameter for normalization, A represents a camera internal parameter, $R_\omega$ represents the rotation matrix corresponding to the quaternion $\omega$ representing the posture of the camera included in the state variable X. The camera internal parameter A is given in advance as expressed in the following equation according to characteristics of the imaging device, which takes the input image.

[Equation 10]

$$A = \begin{pmatrix} -f \cdot k_u & f \cdot k_u \cdot \cot\theta & u_o \\ 0 & -\dfrac{f \cdot k_v}{\sin\theta} & v_o \\ 0 & 0 & 1 \end{pmatrix} \quad (12)$$

Herein, f represents focal distance, $\theta$ represents orthogonality of an image axis (ideal value is 90 degrees), $k_u$ represents a scale along a longitudinal axis of the imaging plane (rate of change of scale from the global coordinate system to the coordinate system of the imaging plane), $k_v$ represents a scale along an abscissa axis of the imaging plane, and ($u_o$, $v_o$) represents a center position of the imaging plane.

Therefore, a feasible latest state variable X may be obtained by searching the state variable X, which makes the error between the predicted observation information derived using the equation (11), that is, the position of each feature point on the imaging plane and the result of feature point tracking at Step S114 in FIG. 4 minimum.

[Equation 11]

$$\text{Latest state variable } X \leftarrow \hat{X} + \text{Innov}(s - \hat{s}) \quad (13)$$

The self-position detecting unit 120 outputs the position x and the posture $\omega$ of the camera (imaging device) dynamically updated by applying the SLAM technology in this manner to the environment map building unit 150 and the output image generating unit 180.

(2) Feature Data Storage Unit

Figure 8:
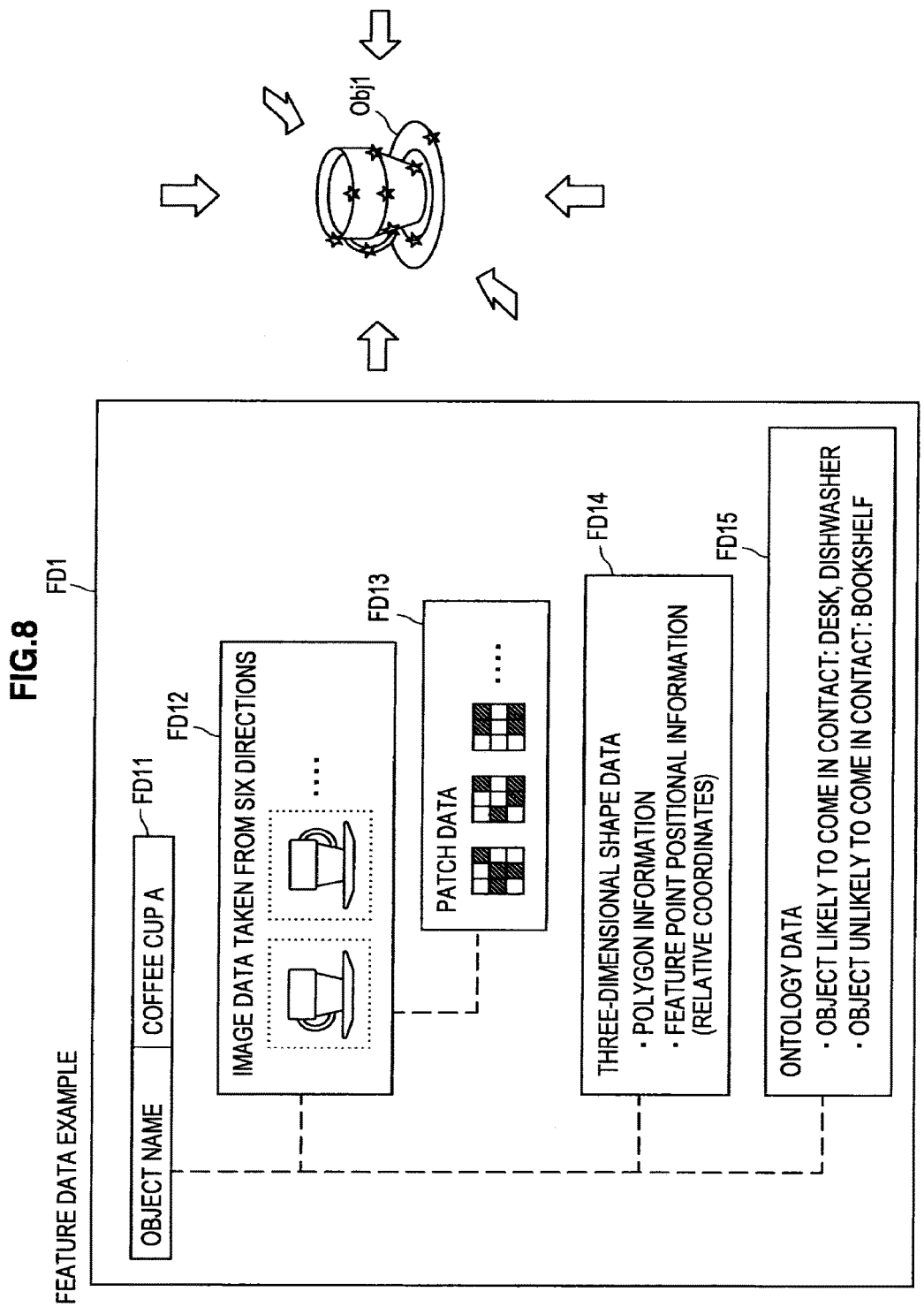
FIG. 8 is an illustrative diagram for illustrating an example of a configuration of feature data.

The feature data storage unit 130 stores in advance the feature data indicating the feature of the object corresponding to the physical object, which may be present in the real space, using a storage medium such as a hard disk or a semiconductor memory. Although an example in which the feature data storage unit 130 is a part of the environment map generating unit 110 is illustrated in FIG. 3, this is not limited to such an example, and the feature data storage unit 130 may be provided outside the environment map generating unit 110. FIG. 8 is an illustrative diagram for illustrating an example of a configuration of the feature data.

With reference to FIG. 8, feature data FD1 as an example about the object Obj1 is illustrated. The feature data FD1 includes an object name FD11, image data FD12 taken from six directions, patch data FD13, three-dimensional shape data FD14, and ontology data FD15.

The object name FD11 is the name with which a corresponding object may be specified such as a "coffee cup A".

The image data FD12 includes six pieces of image data obtained by taking images of the corresponding object from six directions (front, back, left, right, above and below), for example. The patch data FD13 is a set of small images around each feature point for each of one or more feature points set on each object. The image data FD12 and the patch data FD13 may be used for an object recognition process by the image recognizing unit 140 to be described later. Also, the patch data FD13 may be used for the above-described self-position detection process by the self-position detecting unit 120.

The three-dimensional shape data FD14 includes polygon information for recognizing a shape of the corresponding object and three-dimensional positional information of feature points. The three-dimensional shape data FD14 may be used for an environment map building process by the environment map building unit 150 and a CG image generation process for each object to be described later.

The ontology data FD15 is the data, which may be used to assist the environment map building process by the environment map building unit 150, for example. In an example illustrated in FIG. 8, the ontology data FD15 indicates that the object Obj1, which is the coffee cup, is likely to come in contact with an object corresponding to a desk or a dishwasher and is unlikely to come in contact with an object corresponding to a bookshelf.

(3) Image Recognizing Unit

The image recognizing unit 140 specifies correspondences between physical objects present in the input image and objects using the above-described feature data stored in the feature data storage unit 130.

Figure 9:
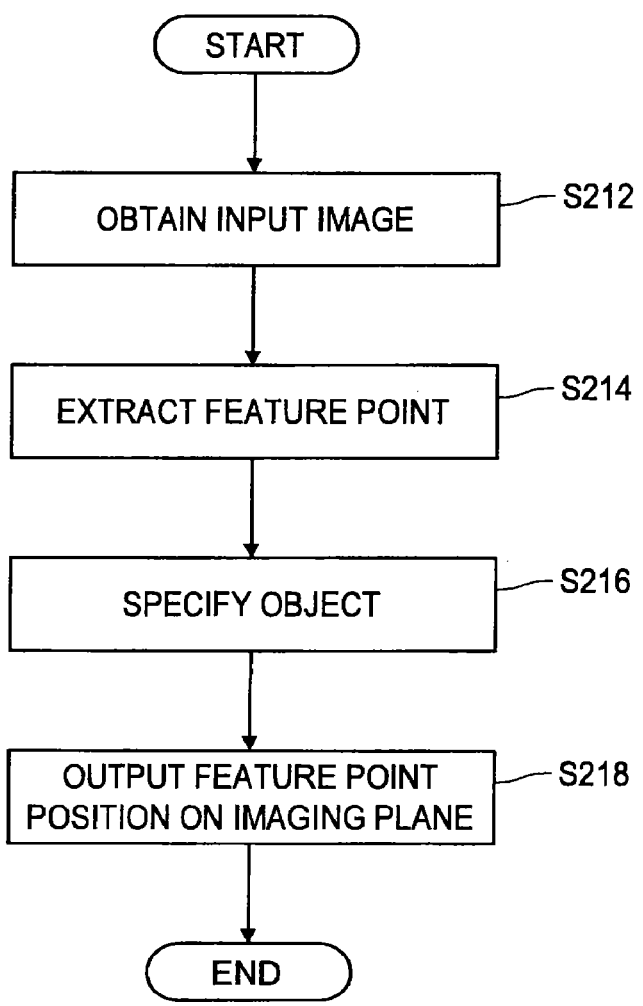
FIG. 9 is a flowchart illustrating an example of a flow of an object recognition process according to the first embodiment.

FIG. 9 is a flowchart illustrating an example of a flow of the object recognition process by the image recognizing unit 140. With reference to FIG. 9, the image recognizing unit 140 first obtains the input image from the imaging unit 102 (Step S212). Next, the image recognizing unit 140 matches partial images included in the input image against patches of one or more feature points of each object included in the feature data to extract feature points included in the input image (Step S214). It should be noted that the feature points used in the object recognition process by the image recognizing unit 140 and the feature points used in the self-position detection process by the self-position detecting unit 120 are not necessarily the same. However, when common feature points are used in the both processes, the image recognizing unit 140 may reuse the result of feature point tracking by the self-position detecting unit 120.

Next, the image recognizing unit 140 specifies the object present in the input image based on an extraction result of the feature point (Step S216). For example, when the feature points belonging to one object are extracted with high density in a certain area, the image recognizing unit 140 may recognize that the object is present in the area. The image recognizing unit 140 then outputs the object name (or an identifier) of the specified object and the position of the feature point belonging to the object on the imaging plane to the environment map building unit 150 (Step S218).

(4) Environment Map Building Unit

The environment map building unit 150 generates the environment map using the position and the posture of the camera input from the self-position detecting unit 120, the positions of the feature points on the imaging plane input from the image recognizing unit 140, and the feature data stored in the feature data storage unit 130. In this specification, the environment map is a set of data indicating positions (and postures) of one or more objects present in the real space. The environment map may include object names corresponding to objects, the three-dimensional positions of feature points belonging to objects, and the polygon information configuring shapes of objects, for example. The environment map may be built by obtaining the three-dimensional position of each feature point according to the above-described pinhole model from the position of the feature point on the imaging plane input from the image recognizing unit 140, for example.

By deforming the relation equation of the pinhole model expressed in the equation (11), the three-dimensional position $p_i$ of the feature point $FP_i$ in the global coordinate system may be obtained by the following equation.

[Equation 12]

$$p_i = x + \lambda \cdot R_\omega^T \cdot A^{-1} \cdot \tilde{p}_i = x + d \cdot R_\omega^T \frac{A^{-1} \cdot \tilde{p}_i}{\|A^{-1} \cdot \tilde{p}_i\|} \quad (14)$$

Herein, d represents distance between the camera and each feature point in the global coordinate system. The environment map building unit 150 may calculate such distance d based on the positions of at least four feature points on the imaging plane and the distance between the feature points for each object. The distance between the feature points is stored in advance in the feature data storage unit 130 as the three-dimensional shape data FD14 included in the feature data illustrated with reference to FIG. 8. It should be noted that, a calculation process of the distance d in the equation (14) is disclosed in detail in Japanese Patent Application Laid-Open No. 2008-304268.

After the distance d is calculated, remaining variables of a right side of the equation (14) are the position and the posture of the camera input from the self-position detecting unit 120 and the position of the feature point on the imaging plane input from the image recognizing unit 140, and all of which are known. The environment map building unit 150 then calculates the three-dimensional position in the global coordinate system for each feature point input from the image recognizing unit 140 according to the equation (14). The environment map building unit 150 then builds a latest environment map according to the three-dimensional position of each calculated feature point and allows the environment map storage unit 152 to store the built environment map. It should be noted that, at that time, the environment map building unit 150 may improve accuracy of the data of the environment map using the ontology data FD15 included in the feature data illustrated with reference to FIG. 8.

The environment map storage unit 152 stores the environment map built by the environment map building unit 150 using the storage medium such as the hard disk or the semiconductor memory.

2-3. Output Image Generating Unit

The output image generating unit 180 generates a superimposition display image by setting superimposition display data at a position of an object having a predetermined flat surface or curved surface out of an object in an input image based on the environment map, and superimposes the superimposition display image on the input image, thereby generating an output image. As illustrated in FIG. 3, in this embodiment, the output image generating unit 180 includes a superimposition display data storage unit 181, a process executing unit 182, an operating object recognizing unit 183, a superimposition display image generating unit 184, a superimposition display position determining unit 186, and an image superimposing unit 188.

Figure 10A:
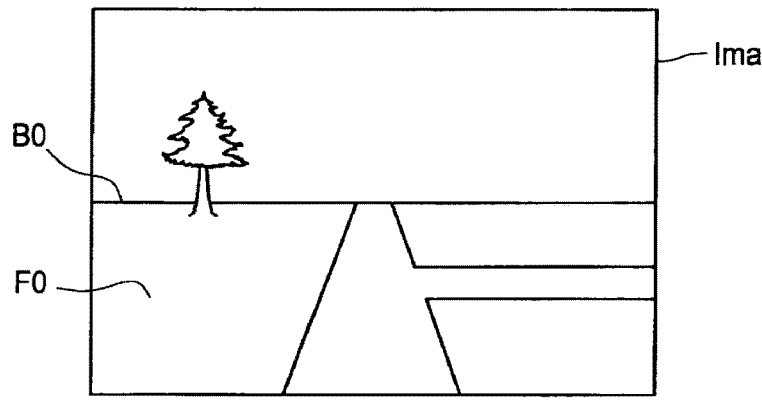
FIG. 10A is a diagram illustrating an example of an output image generated by the image processing device when a user who wears an imaging device faces front.
Figure 10B:
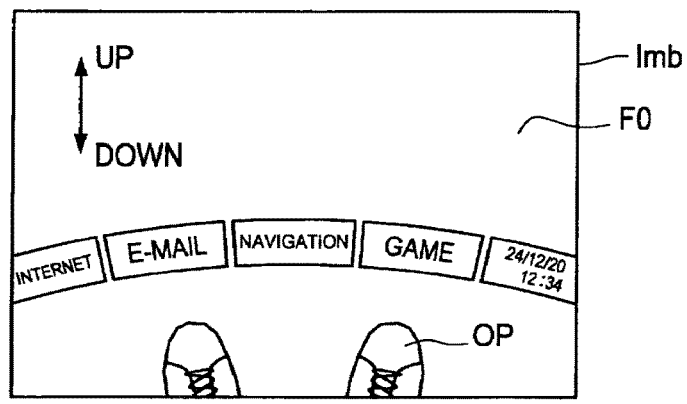
FIG. 10B is a diagram illustrating an example of an output image generated when the user looks down.
Figure 10C:
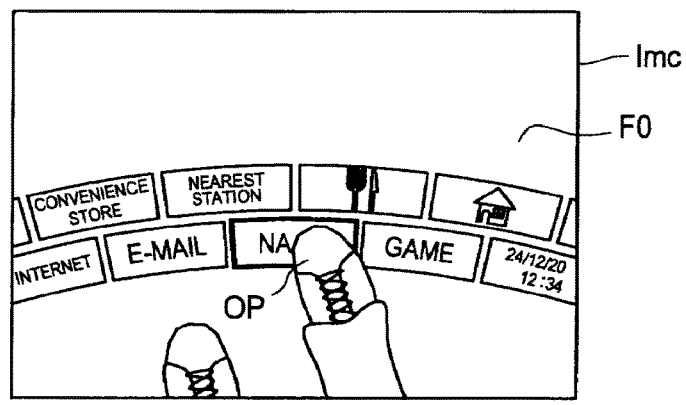
FIG. 10C is a diagram illustrating an example of an output image generated by item selection of a first stage layer.
Figure 10D:
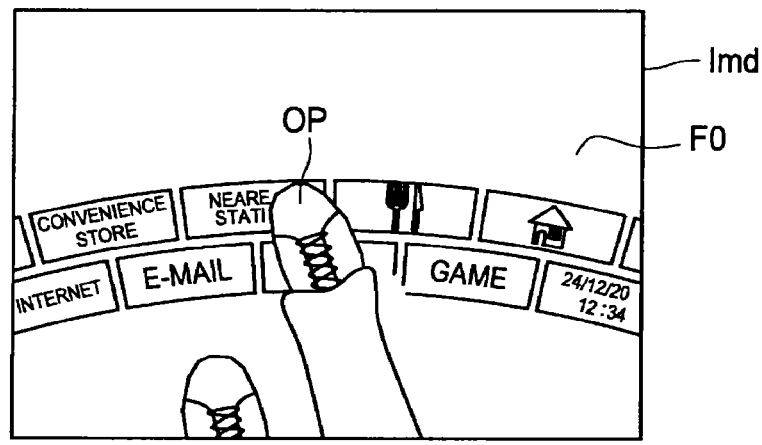
FIG. 10D is a diagram illustrating an example of an output image immediately before an item in a second stage layer is selected.
Figure 10E:
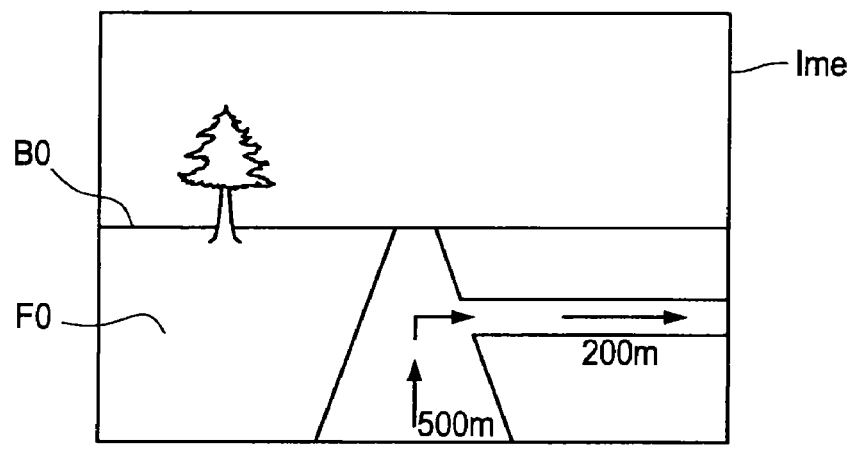
FIG. 10E is a diagram illustrating an example of an output image generated by item selection of the second stage layer.

FIG. 10A is a diagram illustrating an example of an output image generated by the image processing device 100 when a user who wears an imaging device faces front. FIG. 10B is a diagram illustrating an example of an output image generated when the user looks down. FIG. 10C is a diagram illustrating an example of an output image generated by item selection of a first stage layer. FIG. 10D is a diagram illustrating an example of an output image immediately before an item in a second stage layer is selected. FIG. 10E is a diagram illustrating an example of an output image generated by item selection of the second stage layer. By using FIGS. 10A to 10E, functions of respective blocks that configure the output image generating unit 180 will be described.

(1) Superimposition Display Data Storage Unit

The superimposition display data storage unit 181 stores superimposition display data which is to be a source of an image that is superimposed on an input image and an item position which is a position of an item forming the superimposition display data, by using a storage medium such as a hard disk or a semiconductor memory. The configuration example of various types of data stored in the superimposition display data storage unit 181 will be described later with reference to FIG. 11.

(2) Superimposition Display Position Determining Unit

The superimposition display position determining unit 186 determines a position of an object having a predetermined flat surface or curved surface out of an object imaged in an input image based on the environment map stored in the environment map storage unit 152. The superimposition display position determining unit 186 determines, as the position of the object having a predetermined flat surface or curved surface, a position of an object having a flat surface that extends in a substantially horizontal direction, for example. As illustrated in FIG. 10A, in this embodiment, the superimposition display position determining unit 186 determines a position of a floor surface F0 as the position of the object having a flat surface that extends in a substantially horizontal direction, but the object having a flat surface that extends in a substantially horizontal direction is not limited thereto, and may be a table top, a staircase, and the like. Note that, in an output image Ima illustrated in FIG. 10A, the floor surface F0 as an example of the flat surface that extends in a substantially horizontal direction extends within a boundary B0. The superimposition display position determining unit 186 outputs the determined position to the superimposition display image generating unit 184.

(3) Superimposition Display Image Generating Unit

The superimposition display image generating unit 184 sets superimposition display data at the position of the object determined by the superimposition display position determining unit 186, thereby generating a superimposition display image. In the case where the position of the object determined by the superimposition display position determining unit 186 is a position of the floor surface F0, the superimposition display image generating unit 184 generates the superimposition display image by setting, by the superimposition display image generating unit 184, superimposition display data at the position of the floor surface F0. Since the superimposition display image generated by the superimposition display image generating unit 184 is used for generating an output image, the superimposition display image generating unit 184 outputs the generated superimposition display image to the image superimposing unit 188.

(4) Image Superimposing Unit

The image superimposing unit 188 generates an output image by superimposing a superimposition display image on an input image. An output image Imb illustrated in FIG. 10B is obtained by superimposing a superimposition display image containing images such as "E-mail", "Navigation", and "Game" on an input image containing an image such as the floor surface F0. The output image Imb illustrated in FIG. 10B contains an image of a foot as an example of an operating object OP of the user himself/herself. The image superimposing unit 188 then outputs the output image generated in this manner to a display device D (or another functional unit as necessary) as a result of the process by the image processing device 100. The display device D is an example of a display unit and displays the output image.

The image superimposing unit 188 may output the output image at the stage of detecting that the user looks down at a gradient exceeding a predetermined value. That is, the image superimposing unit 188 may cause the display device D to display the generated output image in the case where a sensor, which detects the gradient of an imaging device, detects that the user wearing an imaging device on the head tilts the head in a downward direction at a gradient exceeding the predetermined value. Further, the image superimposing unit 188 may restrict displaying the generated output image, the display being performed by the display device D, in the case where the sensor, which detects the gradient of the imaging device, does not detect that the user wearing the imaging device on the head tilts the head in a downward direction at a gradient exceeding the predetermined value. More specifically, the image superimposing unit 188 may not cause the display device D to display the generated output image but may cause the display device D to display the input image in the case where the sensor, which detects the gradient of the imaging device, does not detect that the user wearing the imaging device on the head tilts the head in a downward direction at a gradient exceeding the predetermined value. In this way, the output image on which the superimposition display data is superimposed is not generated in the case where, for example, the user faces front and has not an intention to view the superimposition display data.

In the case where a flat surface (such as floor surface F0) of a superimposition destination is far away from the head of the user, since it is assumed that the superimposition display data becomes too small when the superimposition display data is superimposed on the flat surface of the superimposition destination, the superimposition display data may not be superimposed on the flat surface of the superimposition destination. Therefore, for example, in the case where a distance from a position of the image processing device 100 detected by the self-position detecting unit 120 to a position of an object determined by the superimposition display position determining unit 186 exceeds a predetermined value, the image superimposing unit 188 may restrict displaying the output image, the display being performed by the display device D. More specifically, in the case where the distance from the position of the image processing device 100 detected by the self-position detecting unit 120 to the position of the object determined by the superimposition display position determining unit 186 exceeds the predetermined value, the image superimposing unit 188 may not cause the display device D to display the output image and may perform control such as causing the display device D to display the input image.

FIG. 11 is a diagram illustrating an example of data stored in the superimposition display data storage unit 181. As illustrated in FIG. 11, the superimposition display data storage unit 181 stores, in addition to the superimposition display data, one or multiple combinations of item positional information indicating a position of each item forming the superimposition display data and a process content indicating a content of a process to be executed when the item is selected, each of which is associated to the superimposition display data.

Figure 12:
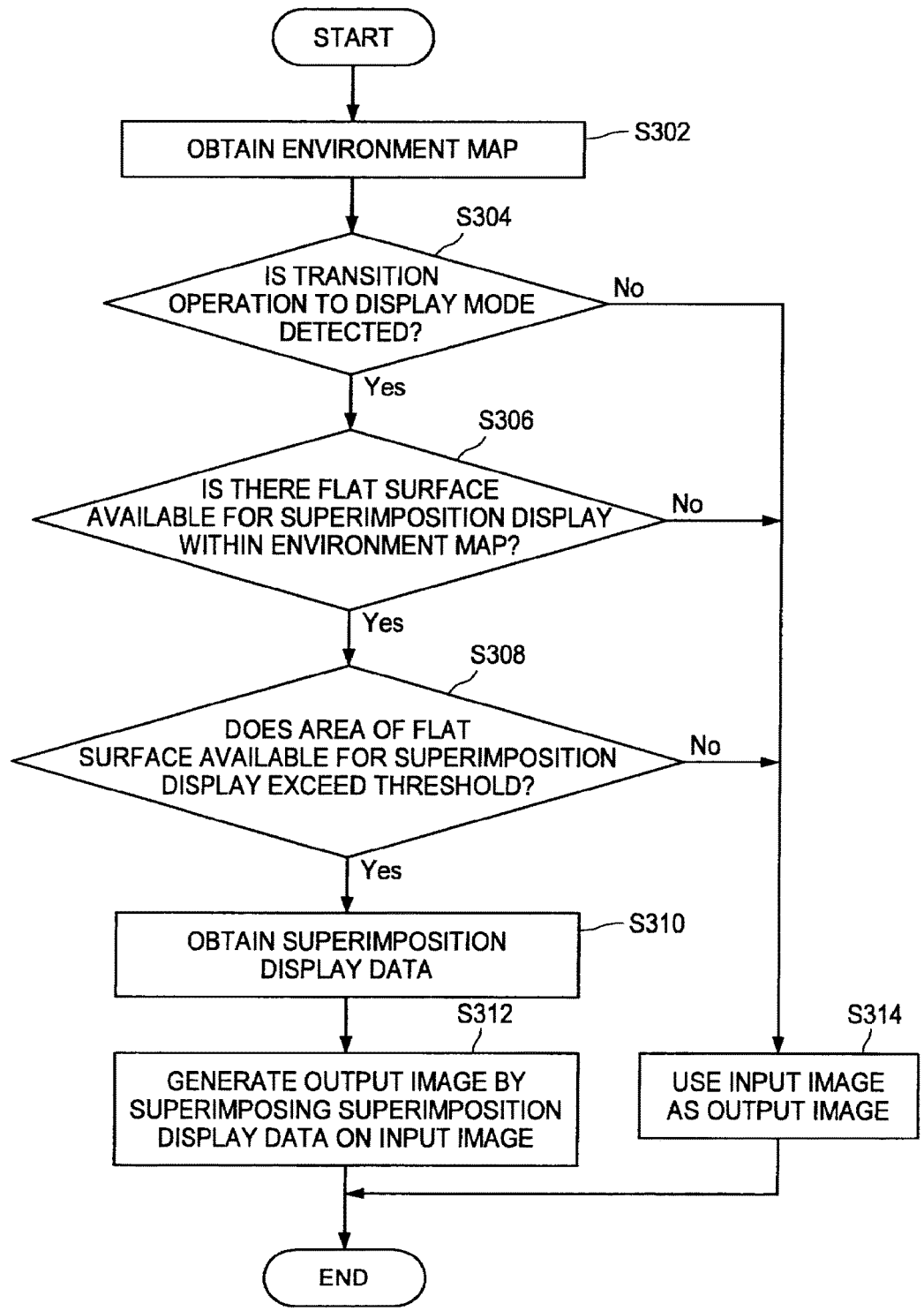
FIG. 12 is a flowchart illustrating an example of a flow of an output image generation process according to the first embodiment.

FIG. 12 is a flowchart illustrating an example of a flow of an output image generation process performed by the output image generating unit 180. In FIG. 12, when the output image generation process starts, first, the superimposition display position determining unit 186 obtains an environment map from the environment map building unit 150 (Step S302). Then, the superimposition display position determining unit 186 determines whether or not transition operation to a display mode is detected (Step S304). Although the transition operation to the display mode is performed when the user who wears an imaging device looks down in the example described above, the transition operation to the display mode may also be performed when the user inputs the operation to an input device or the like. The processes from Step S302 to Step S314 may be repeated for each input image (that is, each frame).

In the case where the superimposition display position determining unit 186 determines that the transition operation to the display mode is not detected ("No" in Step S304), the process proceeds to Step S314, and in the case where the superimposition display position determining unit 186 determines that the transition operation to the display mode is detected ("Yes" in Step S304), the superimposition display position determining unit 186 determines whether or not there is a flat surface available for superimposition display within the obtained environment map (Step S306). Although it is determined whether or not there is a flat surface available for the superimposition display within the obtained environment map, it may also be determined, as described above, whether or not there is a curved surface available for the superimposition display within the obtained environment map.

In the case where the superimposition display position determining unit 186 determines that there is no flat surface available for the superimposition display within the obtained environment map ("No" in Step S306), the process proceeds to Step S314, and in the case where the superimposition display position determining unit 186 determines that there is a flat surface available for the superimposition display within the obtained environment map ("Yes" in Step S306), the superimposition display position determining unit 186 determines whether or not an area of the flat surface available for the superimposition display exceeds a threshold (Step S308). In the case where the superimposition display position determining unit 186 determines that the area of the flat surface available for the superimposition display does not exceed a threshold ("No" in Step S308), the process proceeds to Step S314, and in the case where the superimposition display position determining unit 186 determines that the area of the flat surface available for the superimposition display exceeds a threshold ("Yes" in Step S308), the process proceeds to Step S310.

In Step S310, the superimposition display image generating unit 184 obtains superimposition display data from the superimposition display data storage unit 181, the image superimposing unit 188 generates an output image by superimposing the superimposition display data on the input image (Step S312), and the output image generation process is completed. In Step S314, the input image is used as the output image (Step S314), and the output image generation process is completed.

(5) Operating Object Recognizing Unit

The operating object recognizing unit 183 recognizes an operating object OP of a user which is imaged in an input image. In this embodiment, the operating object recognizing unit 183 recognizes a foot imaged in the input image as an example of the operating object OP of the user, but a part other than the foot may be recognized as the operating object OP of the user. For example, in the case where the superimposition display position determining unit 186 determines a position of a table top as a position of an object having a flat surface that extends in a substantially horizontal direction, the operating object recognizing unit 183 may recognize a hand imaged in the input image as the operating object OP of the user. It is because when the table top is being imaged in the input image, it can be assumed that the user can easily place his/her hand on the table top.

In addition thereto, various other techniques can be assumed as the technique that the operating object recognizing unit 183 recognizes the operating object OP of the user which is imaged in the input image. For example, the operating object recognizing unit 183 performs matching between a shoe registration image which is an image of a shoe which has been registered in advance and the input image, and in the case where the operating object recognizing unit 183 determines that a shoe which matches with the shoe in the shoe registration image is imaged in the input image, the shoe may be recognized as the operating object of the user.

Further, in the case where the user wears the imaging device on the head, the operating object recognizing unit 183 may determine whether or not a foot imaged in the input image is coming in from a side which is the nearest from the user among respective sides that form the input image. In the output image Imb illustrated in FIG. 10B, there is shown a state in which a foot (an example of the operating object OP) imaged in the input image is coming in from the side (the side in the bottom direction of FIG. 10B) which is the nearest from the user among respective sides that form the input image. In the case where the operating object recognizing unit 183 determines that the foot is coming in from the side which is the nearest from the user, the operating object recognizing unit 183 may recognize the foot as the operating object OP of the user.

Further, the operating object recognizing unit 183 may also determine whether or not a shoe with a mark, which has been subjected to predetermined marking in advance, is imaged in the input image. In the case where the operating object recognizing unit 183 determines that the shoe with a mark is imaged in the input image, the operating object recognizing unit 183 may recognize the shoe as the operating object OP of the user.

The operating object recognizing unit 183 may recognize the operating object OP of the user by using, for example, general image recognition technology. When recognizing the operating object OP of the user, the operating object recognizing unit 183 can grasp a position of the operating object OP of the user. That is, as a result of recognizing the operating object OP of the user, the operating object recognizing unit 183 outputs the position of the operating object OP of the user to the process executing unit 182.

(6) Process Executing Unit

The process executing unit 182 executes a process corresponding to an item selected based on the position of the operating object OP recognized by the operating object recognizing unit 183. The item forms superimposition display data, and in the output image Imb illustrated in FIG. 10B, "E-mail", "Navigation", and "Game" each represent an item. Item positional information indicating a position of the item is stored in the superimposition display data storage unit 181 as the item positional information as illustrated in FIG. 11, and, within the output image, each item is present at the position which is displaced from a position of the superimposition display data by a position indicated by the item positional information. The process executing unit 182 selects an item that corresponds with the position of the operating object OP among the items which are present as described above. An output image Imc illustrated in FIG. 10C is obtained by, when the user moves the operating object OP of the user to the position of an item "Navigation", performing, as a process corresponding to the item "Navigation", a process of superimposing superimposition display data for selecting an item such as "Nearest station" or "Convenience store" on the input image by the process executing unit 182.

There can be assumed various timings as a timing at which the process executing unit 182 executes the process. In the case where the user uses the foot as the operating object OP, the process executing unit 182 may determine whether or not a contact is detected by a contact sensor attached to the foot. In that case, in the case where the contact is detected by the contact sensor, the process executing unit 182 may execute a process corresponding to an item selected based on the position of the foot.

Further, the process executing unit 182 may determine whether or not the operating object OP recognized by the operating object recognizing unit 183 has stopped at substantially the same position for a predetermined time period. In that case, in the case where the process executing unit 182 determines that the operating object OP has stopped at substantially the same position for the predetermined time period, the process executing unit 182 may execute a process corresponding to an item selected based on the position of the operating object OP. Further, the process executing unit 182 may also determine whether or not the operating object OP recognized by the operating object recognizing unit 183 is present in a predetermined region which is set in a corresponding manner to an item. In that case, in the case where the process executing unit 182 determines that the operating object OP is present in the predetermined region, for example, the process executing unit 182 may execute a process corresponding to the item corresponding to the predetermined region.

In the output image Imb illustrated in FIG. 10B, superimposed is superimposition display data (including items such as "E-mail", "Navigation", and "Game") of a first stage layer, and in the output image Imc illustrated in FIG. 10C, superimposed is superimposition display data (including items such as "Convenience store" and "Nearest station") of a second stage layer. In this way, the superimposition display data may be hierarchically superimposed on the input image. In that case, the superimposition display data storage unit 181 stores other superimposition display data which is displayed subsequently to the superimposition display data, and, when the item is selected by the process executing unit 182, the superimposition display image generating unit 184 generates a new superimposition display image by further setting the other superimposition display data. Then, when the item is selected by the process executing unit 182, the image superimposing unit 188 further superimposes the other superimposition display data on the new superimposition display image, thereby generating a new output image.

An output image Imd illustrated in FIG. 10D is obtained by, when the user moves the operating object OP of the user to the position of an item "Nearest station", performing, as a process corresponding to the item "Nearest station", a process of executing an application for searching for a route to "Nearest station" by the process executing unit 182. An output image Ime illustrated in FIG. 10E illustrates an example of a search result.

In addition thereto, there can be assumed a case where all items which form the superimposition display data do not fit into the output image. In such a case, a part of the superimposition display data may be superimposed on the output image, and in the case where the user rotates the head in a substantially horizontal direction, the continuation of the superimposition display data may be superimposed on the output image. That is, for example, in the case where a sensor which detects the rotation of the imaging device detects that the user wearing an imaging device on the head rotates his/her head in a substantially horizontal direction, the superimposition display image generating unit 184 may change a setting position of the superimposition display data in accordance with the degree of the rotation. Accordingly, the superimposition display image generating unit 184 can move the superimposition display data set in the superimposition display image.

Figure 13:
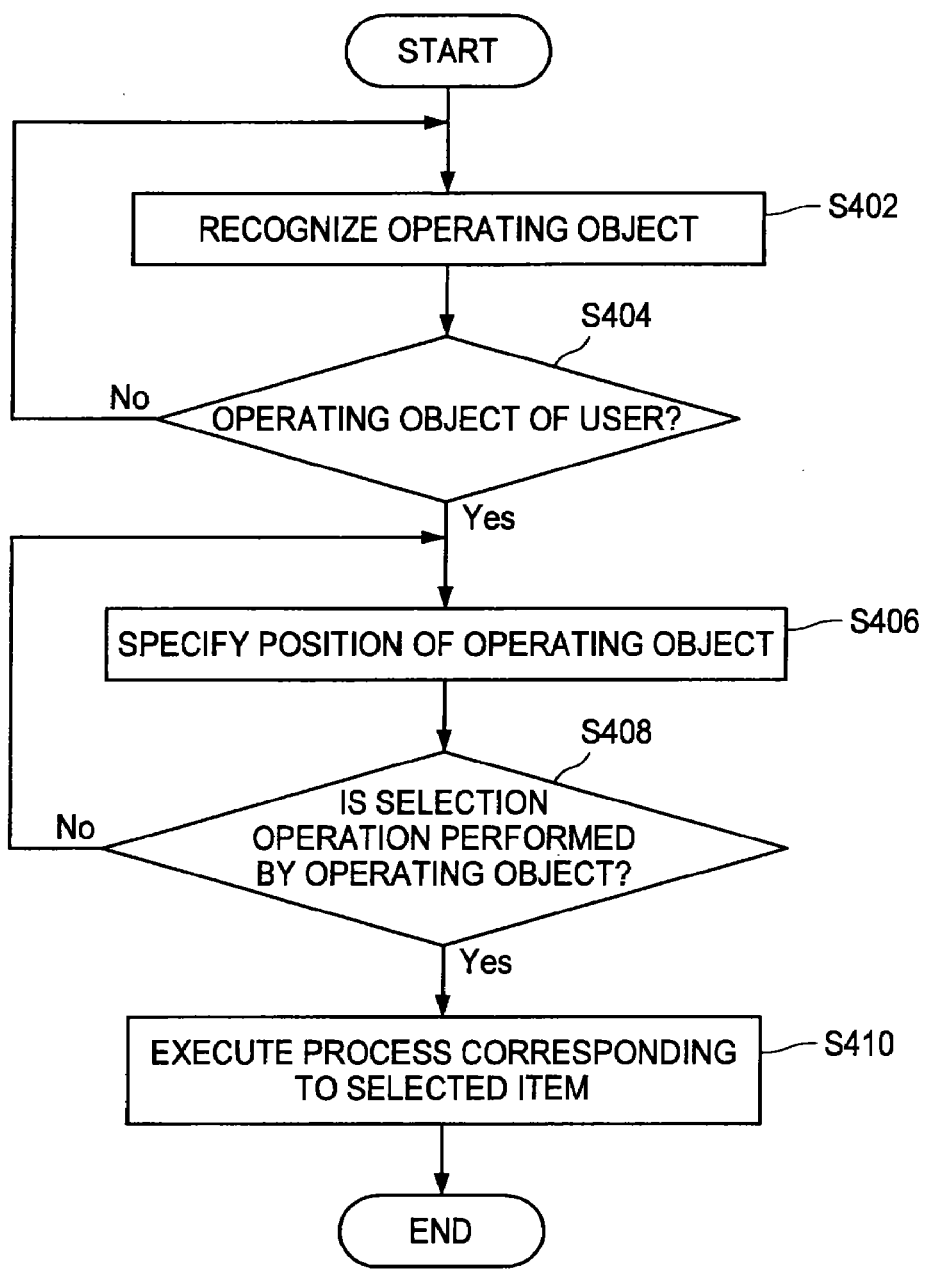
FIG. 13 is a flowchart illustrating an example of a flow of an item selection process according to the first embodiment.

FIG. 13 is a flowchart illustrating an example of a flow of an item selection process performed by the output image generating unit 180. In FIG. 13, when the item selection process starts, first, the operating object recognizing unit 183 recognizes an operating object OP (Step S402). Then, the operating object recognizing unit 183 determines whether or not the operating object OP is an operating object OP of a user (Step S404). The processes from Step S402 to Step S410 may be repeated for each input image (that is, each frame).

The operating object recognizing unit 183 determines whether or not the recognized operating object OP is the operating object OP of the user (Step S404). In the case where the operating object recognizing unit 183 determines that the recognized operating object OP is not the operating object OP of the user ("No" in Step S404), the process returns to Step S402. In the case where the operating object recognizing unit 183 determines that the recognized operating object OP is the operating object OP of the user ("Yes" in Step S404), the operating object recognizing unit 183 specifies a position of the operating object OP (Step S406).

Subsequently, the process executing unit 182 determines whether or not operation of selecting an item is performed by the operating object OP (Step S408). In the case where the process executing unit 182 determines that the operation of selecting an item is not performed by the operating object OP ("No" in Step S408), the process returns to Step S406. In the case where the process executing unit 182 determines that the operation of selecting an item is performed by the operating object OP ("Yes" in Step S408), the process executing unit 182 executes the process corresponding to the selected item (Step S410), and the item selection process is completed.

2-4. Summary of First Embodiment

According to the image processing device 100 according to this embodiment, the output image obtained by superimposing the superimposition display data is generated based on the environment map representing the three-dimensional position of objects corresponding to the objects existing in the real space.

According to this, it becomes possible to generate the output image which is easier for the user to view.

Further, according to this embodiment, it is possible to recognize the position of the operating object OP of the user, and, based on the recognized position, to select an item which forms the superimposition display data superimposed on the input image. Therefore, the input of operation by the user can be facilitated in the configuration in which a shot image is modified by the AR technology and displayed by the HMD.

3. Second Embodiment

In the first embodiment, an example in which the wall surface and the floor surface in the real space are also recognized as the objects is described. On the other hand, in the case where the feature data corresponding to the wall surface or the floor surface is not defined in advance, the wall surface or the floor surface is not included in the environment map. In this case, it is preferable to additionally recognize the wall surface or the floor surface to generate the output image according to a recognition result. Therefore, in this section, an example of the configuration of the image processing device capable of additionally recognizing the wall surface or the floor surface when the wall surface or the floor surface is not included in the environment map is described as a second embodiment of the present invention.

Figure 14:
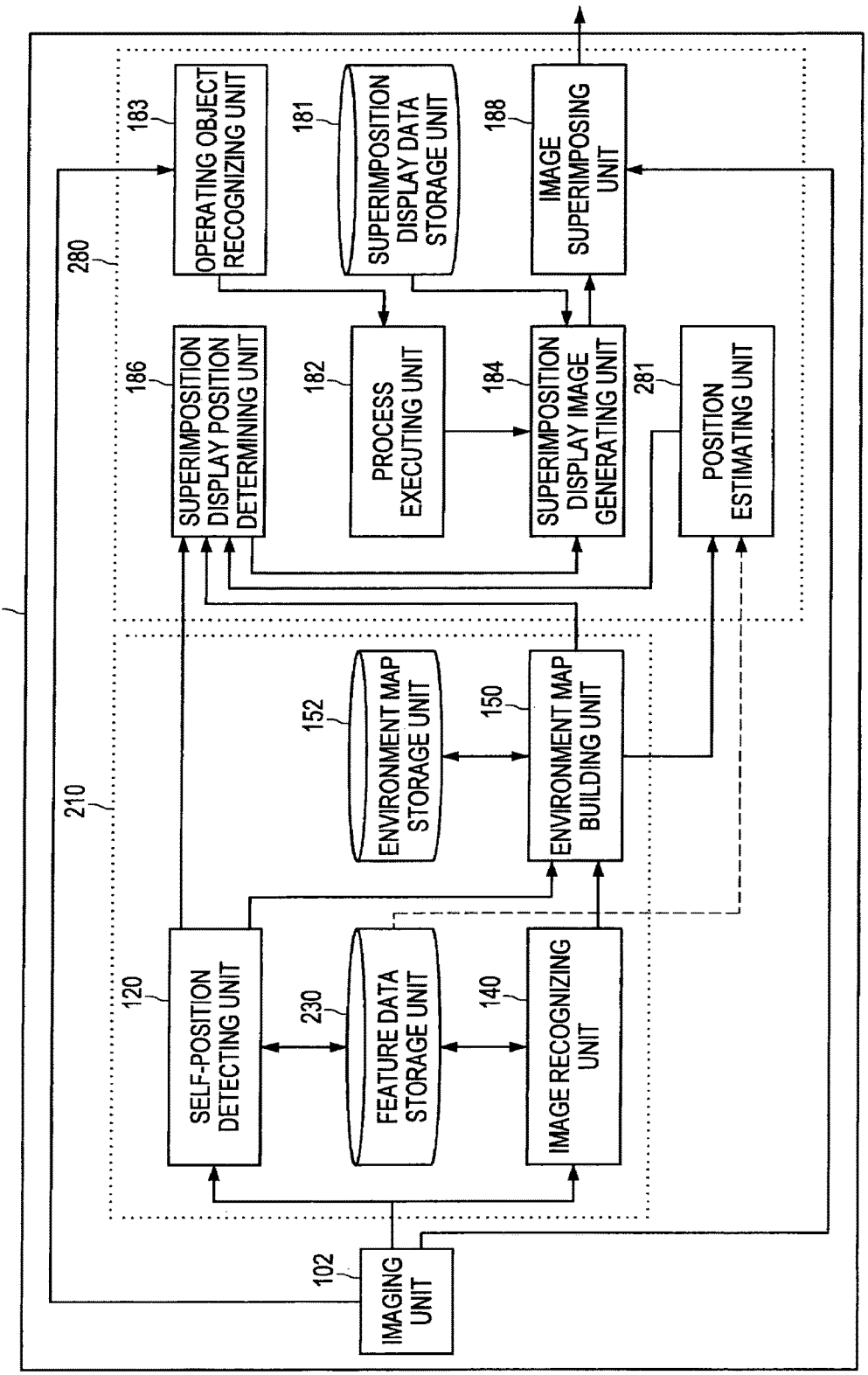
FIG. 14 is a block diagram illustrating an example of the configuration of the image processing device according to a second embodiment.

FIG. 14 is a block diagram illustrating an example of a configuration of an image processing device 200 according to the second embodiment. With reference to FIG. 14, the image processing device 200 includes the imaging unit 102, an environment map generating unit 210, and an output image generating unit 280.

3-1. Environment Map Generating Unit

In this embodiment, the environment map generating unit 210 includes the self-position detecting unit 120, a feature data storage unit 230, the image recognizing unit 140, the environment map building unit 150, and the environment map storage unit 152.

(1) Feature Data Storage Unit

Figure 15:
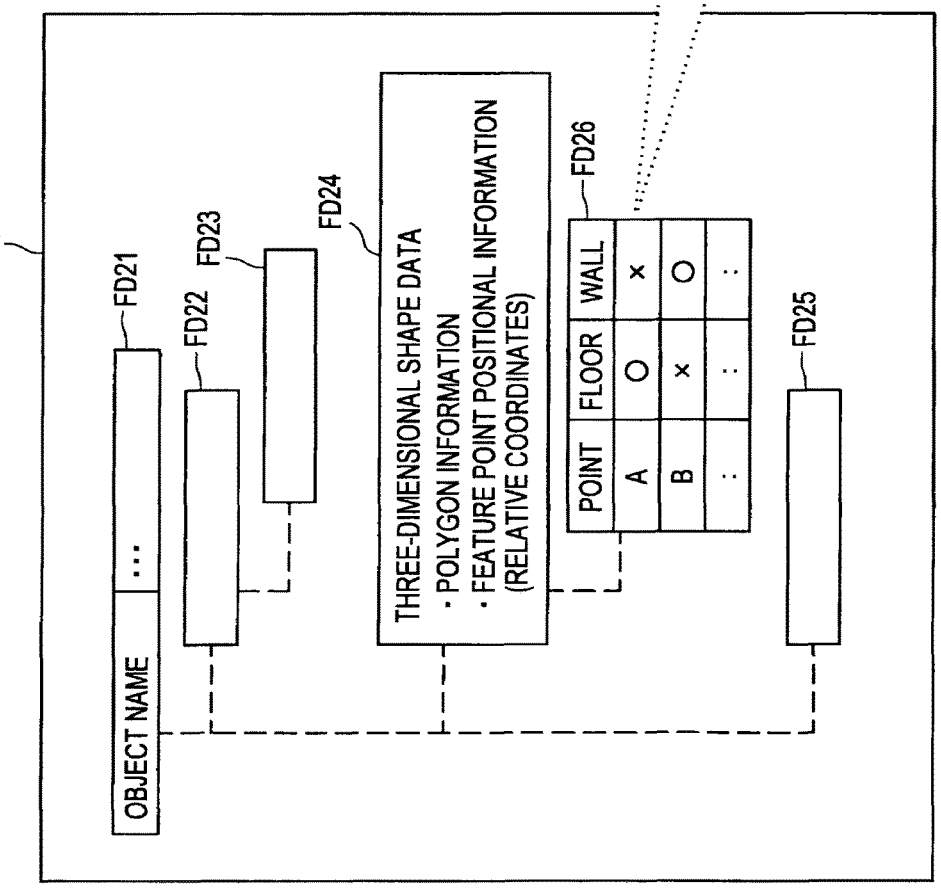
FIG. 15 is an illustrative diagram for illustrating another example of the configuration of the feature data.

The feature data storage unit 230 stores in advance the feature data indicating features of objects corresponding to physical objects, which may exist in the real space, using the storage medium such as the hard disk or the semiconductor memory. In this embodiment, the feature data includes additional data indicating whether a vertex composing the polygon of each object is likely to come in contact with the floor surface or the wall surface in addition to the data illustrated in FIG. 8. FIG. 15 is an illustrative diagram for illustrating an example of the configuration of such feature data.

With reference to FIG. 15, feature data FD2 as an example includes an object name FD21, image data FD22 taken from six directions, patch data FD23, three-dimensional shape data FD24, ontology data FD25, and additional data FD26.

The additional data FD26 has two flags indicating, for each vertex of the polygon of each object defined by the polygon information included in the three-dimensional shape data FD24, whether the vertex is likely to come in contact with the floor surface and whether the vertex is likely to come in contact with the wall surface. For example, in an example illustrated in FIG. 15, the additional data FD26 indicates that a vertex A of the polygon of the object corresponding to the feature data FD2 is likely to come in contact with the floor surface and unlikely to come in contact with the wall surface. Also, the additional data FD26 indicates that a vertex B of the polygon of the object corresponding to the feature data FD2 is unlikely to come in contact with the floor surface and is likely to come in contact with the wall surface. It should be noted that the vertexes of the polygon may be the feature points used in the above-described process by the self-position detecting unit 120 or the image recognizing unit 140, or may be some points other than the feature points.

Figure 16:
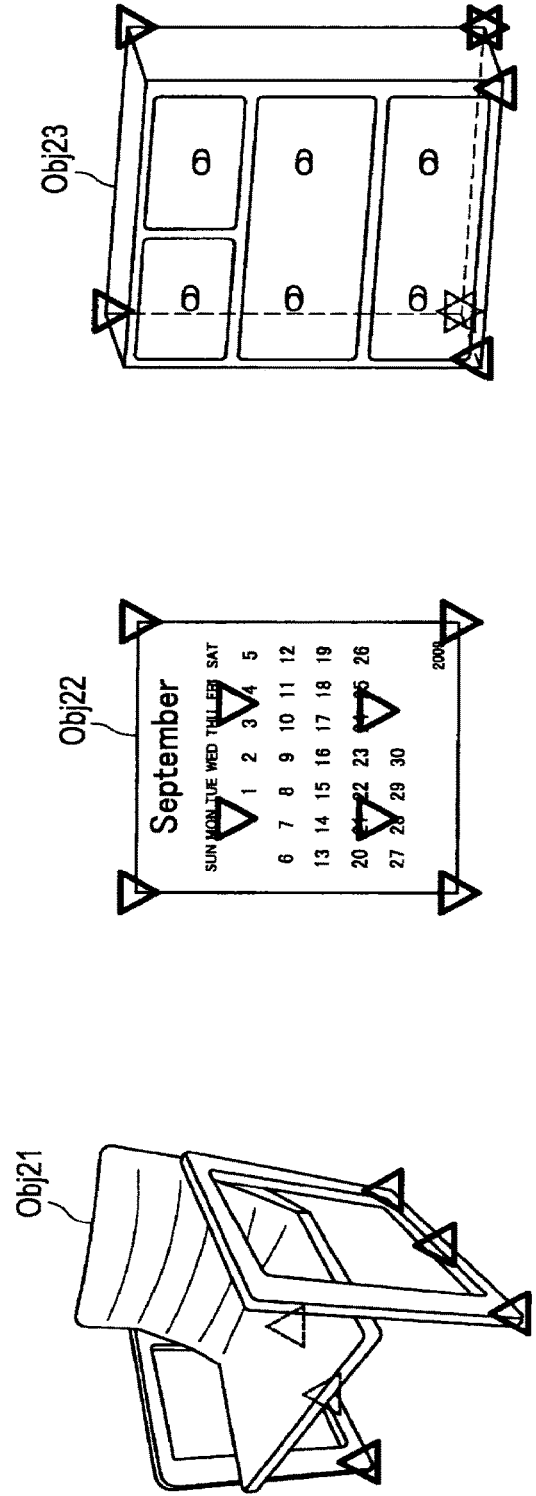
FIG. 16 is an illustrative diagram for illustrating an example of a polygon related to the feature data illustrated in FIG. 15.

FIG. 16 is an illustrative diagram for illustrating an example of the polygon related to the feature data illustrated in FIG. 15. With reference to FIG. 16, three objects Obj21, Obj22, and Obj23 are illustrated. Out of them, the object Obj21 represents a chair. Out of the vertexes of the polygon corresponding to the object Obj21, six vertexes of a portion of legs of the chair are likely to come in contact with the floor surface. Also, the object Obj22 represents the calendar. Eight vertexes out of the vertexes of the polygon corresponding to the object Obj22 are likely to come in contact with the wall surface. Also, the object Obj23 represents the drawer. Four vertexes located on a bottom surface of the drawer out of the vertexes of the polygon corresponding to the object Obj23 are likely to come in contact with the floor surface. Four vertexes located on a rear surface of the drawer out of the vertexes of the polygon corresponding to the object Obj23 are likely to come in contact with the wall surface. The additional data FD26 illustrated in FIG. 15 defines such attribution of each vertex.

In this embodiment, the feature data storage unit 230 of the environment map generating unit 210 stores the feature data including the above-described additional data and outputs the additional data according to request from a position estimating unit 281.

3-2. Output Image Generating Unit

As illustrated in FIG. 14, in this embodiment, the output image generating unit 280 includes the position estimating unit 281, a superimposition display data storage unit 181, a process executing unit 182, an operating object recognizing unit 183, a superimposition display image generating unit 184, a superimposition display position determining unit 186, and an image superimposing unit 188.

(1) Position Estimating Unit

The position estimating unit 281 estimates a position of the floor surface or the wall surface in the real space based on positions of points on surfaces of objects represented by the environment map and the above-described feature data.

In this embodiment, the points on the surfaces of the objects may be the vertexes of the polygon corresponding to each of the above-described objects.

More specifically, the position estimating unit 281 extracts a vertex group indicated by the above-described feature data to be likely to come in contact with the floor surface out of vertex groups of the polygon of the object included in the environment map input from the environment map building unit 150, for example. The position estimating unit 281 then estimates a plane corresponding to the floor surface based on a three-dimensional position of the extracted vertex group in the global coordinate system. The position estimating unit 281 may estimate a feasible plane, which may include the vertex group, from the three-dimensional position of the vertex group using a well-known method of Hough transform, for example.

Similarly, the position estimating unit 281 extracts the vertex group indicated by the above-described feature data to be likely to come in contact with the wall surface out of the vertex groups of the polygon of the object included in the environment map input from the environment map building unit 150, for example. The position estimating unit 281 then estimates a plane corresponding to the wall surface based on the three-dimensional position of the extracted vertex group in the global coordinate system. It should be noted that, in the case where two or more wall surfaces might be present in the real space, the position estimating unit 281 may divide the vertex groups into two or more sets according to the three-dimensional positions thereof, thereby estimating the plane corresponding to the wall surface for each set.

The position estimating unit 281 outputs the position of the floor surface and/or the wall surface estimated in this manner to the superimposition display position determining unit 186.

3-3. Summary of Second Embodiment

According to the image processing device 200 according to this embodiment, the output image obtained by superimposing the superimposition display data is generated based on the environment map representing the three-dimensional position of the object present in the real space. Herein, the position of the floor surface or the wall surface is estimated based on the position of the point likely to come in contact with the floor surface or the wall surface out of the points on the surface of the object included in the environment map.

4. Hardware Configuration

Note that, it does not matter whether a series of processes according to the above-described first and second embodiments are realized by the hardware or software. When a series of processes or a part of the same is executed by the software, a program composing the software is executed using a computer incorporated in dedicated hardware or a general-purpose computer illustrated in FIG. 17, for example.

In FIG. 17, a central processing unit (CPU) 902 controls entire operation of the general-purpose computer. A program or data in which a part of or an entire of the series of processes is described is stored in a read only memory (ROM) 904. The program and data used by the CPU 902 when executing the process are temporarily stored in a random access memory (RAM) 906.

The CPU 902, the ROM 904, and the RAM 906 are connected to each other through a bus 910. An input/output interface 912 is further connected to the bus 910.

The input/output interface 912 is the interface to connect the CPU 902, the ROM 904, and the RAM 906, and an input device 920, a display device 922, a storage device 924, an imaging device 926, and a drive 930.

The input device 920 accepts instruction from the user and information input through an input interface such as a button, a switch, a lever, a mouse, and a keyboard, for example. However, when the imaging device 926 is present, the input device 920 may be absent. The display device 922 is composed of a cathode ray tube (CRT), a liquid crystal display, an organic light emitting diode (OLED), and the like, for example, and displays the image on a screen thereof. In the embodiment described above, a display unit with which the HMD is equipped corresponds to the display device 922.

The storage device 924 is composed of a hard disk drive or the semiconductor memory, for example, and stores the program and the data. The imaging device 926 corresponds to the hardware of the above-described imaging unit 102 and images the real space using the imaging element such as the CCD or the CMOS. The drive 930 is provided on the general-purpose computer as necessary, and removable media 932 is mounted on the driver 930, for example.

When executing the series of processes according to the first and second embodiments by the software, the program stored in the ROM 904, the storage device 924, or the removable media 932 illustrated in FIG. 17 is read into the RAM 906 and executed by the CPU 902, for example.

It should be understood by those skilled in the art that various modifications, combinations, sub-combinations and alterations may occur depending on design requirements and other factors insofar as they are within the scope of the appended claims or the equivalents thereof.

The present application contains subject matter related to those disclosed in Japanese Priority Patent Application JP 2010-068269 filed in the Japan Patent Office on Mar. 24, 2010, and Japanese Priority Patent Application JP 2010-068270 filed in the Japan Patent Office on Mar. 24, 2010, the entire contents of which are hereby incorporated by reference.

SUMMARY OF THE INVENTION

In the meantime, as a compact display device to be mounted on the head, a head mounted display (HMD) has been in widespread use. As a technology that uses an HMD equipped with a camera, there can be exemplified a technology for modifying an image imaged by the camera through the AR technology using an image processing device, and displaying the image modified by the HMD in order for a user to view the modified image. A function which such an HMD has may be realized by a video transmissive HMD, for example. Further, for example, there is also a technology for generating an additional information image using an image imaged by the camera as a source through the AR technology by an image processing device, and optically compositing the generated additional information image using a half mirror and the like within a visual field, in order for a user to view the image. Such functions of the HMD may be realized by an optically transmissive HMD, for example. By using those technologies, the user can easily understand a situation of the real space and a work support based on the output image may be provided. As a processing technology used for a shot image, there can be exemplified a technology of superimposing, on a building imaged in the shot image, information on the building.

Here, it is general that there is an object such as a building being imaged in the vicinity of the front face of the shot image, and according to this reason, it is general that, in the vicinity of the front face of the output image displayed on the HMD, information on an object such as information on a building is displayed in a superimposed manner. Therefore, when data (hereinafter, referred to as "superimposition display data") which is not directly dependent on an object imaged in the shot image, such as menu, advertisement, schedule, and memo, is displayed in a superimposed manner in the vicinity of the front face of the shot image, there may occur a case where the superimposition display data and the information on the object imaged in the taken image are overlapped or close to each other. When such a case occurred, there was an issue that it became difficult for a user to view a superimposed image obtained by superimposing the superimposition display data on the shot image.

In light of the foregoing, it is desirable to provide an image processing device, an image processing method, and a program which are novel and improved, and which can render the superimposed image obtained by superimposing the superimposition display data on the visual field of the user easily viewable.

According to an embodiment of the present invention, there is provided an image processing device which includes a feature data storage unit which stores feature data indicating a feature of appearance of an object, a superimposition display data storage unit which stores superimposition display data which is to be a source of an image that is superimposed on a visual field of a user, an environment map generating unit which generates an environment map representing a position of one or more objects existing in a real space based on an input image obtained by imaging the real space using an imaging device and the feature data stored in the feature data storage unit, a superimposition display position determining unit which determines a position of an object having a predetermined flat surface or curved surface out of an object imaged in the input image based on the environment map, a superimposition display image generating unit which generates a superimposition display image by setting the superimposition display data at the position of the object determined by the superimposition display position determining unit, and an image superimposing unit which superimposes the superimposition display image on the visual field of the user and causes a display unit to display the superimposition display image.

When the image superimposing unit detects, by using a sensor which detects the gradient of the imaging device, that a user wearing the imaging device on his/her head tilts the head in a downward direction at a gradient exceeding a predetermined value, the image superimposing unit may cause the display unit to display the superimposition display image, and when the image superimposing unit does not detect that a user wearing the imaging device on his/her head tilts the head in a downward direction at a gradient exceeding the predetermined value by using the sensor which detects the gradient of the imaging device, the image superimposing unit may restrict displaying the superimposition display image, the display being performed by the display unit.

The image processing device may further include a self-position detecting unit which dynamically detects a position of the image processing device based on the input image and the feature data. When a distance from the position of the image processing device detected by the self-position detecting unit to the position of the object determined by the superimposition display position determining unit exceeds a predetermined value, the image superimposing unit may restrict displaying the superimposition display image, the display being performed by the display unit.

The superimposition display position determining unit may determine, as the position of the object having the predetermined flat surface or curved surface, a position of an object having a flat surface that extends in a substantially horizontal direction.

The superimposition display position determining unit may determine, as the position of the object having the flat surface that extends in a substantially horizontal direction, a position of at least a floor surface, a table top, and a staircase.

When the superimposition display image generating unit detects, by using a sensor which detects rotation of the imaging device, that the user wearing the imaging device on his/her head rotates the head in a substantially horizontal direction, the superimposition display image generating unit may move the superimposition display data set in the superimposition display image by changing a setting position of the superimposition display data in accordance with a degree of the rotation.

The image processing device may further include a position estimating unit which estimates a position of a floor surface or a wall surface in the real space based on a position of a point on a surface of the object represented by the environment map. The superimposition display position determining unit may determine the position of the floor surface as the position of the object further based on the position of the floor surface or the wall surface estimated by the position estimating unit.

The feature data may include data indicating, for one or more points on the surface of each object, whether each point is likely to come in contact with the floor surface or the wall surface in the real space. The position estimating unit may estimate the position of the floor surface or the wall surface in the real space further based on the feature data.

Further, according to another embodiment of the present invention, there is provided an image processing method performed by an image processing device which includes a feature data storage unit which stores feature data indicating a feature of appearance of an object, a superimposition display data storage unit which stores superimposition display data which is to be a source of an image that is superimposed on a visual field of a user, an environment map generating unit, a superimposition display position determining unit, a superimposition display image generating unit, and an image superimposing unit, the image processing method including the steps of generating, by the environment map generating unit, an environment map representing a position of one or more objects existing in a real space based on an input image obtained by imaging the real space using an imaging device and the feature data stored in the feature data storage unit, determining, by the superimposition display position determining unit, a position of an object having a predetermined flat surface or curved surface out of an object imaged in the input image based on the environment map, generating, by the superimposition display image generating unit, a superimposition display image by setting the superimposition display data at the position of the object determined by the superimposition display position determining unit, and superimposing, by the image superimposing unit, the superimposition display image on the visual field of the user, and causing, by the image superimposing unit, a display unit to display the superimposition display image.

Further, according to another embodiment of the present invention, there is provided a program for causing a computer to function as an image processing device which includes a feature data storage unit which stores feature data indicating a feature of appearance of an object, a superimposition display data storage unit which stores superimposition di splay data which is to be a source of an image that is superimposed on a visual field of a user, an environment map generating unit which generates an environment map representing a position of one or more objects existing in a real space based on an input image obtained by imaging the real space using an imaging device and the feature data stored in the feature data storage unit, a superimposition display position determining unit which determines a position of an object having a predetermined flat surface or curved surface out of an object imaged in the input image based on the environment map, a superimposition display image generating unit which generates a superimposition display image by setting the superimposition display data at the position of the object determined by the superimposition display position determining unit, and an image superimposing unit which superimposes the superimposition display image on the visual field of the user and causes a display unit to display the superimposition display image.

According to the image processing device, the image processing method, and the program of the present embodiments described above, it is possible to render the superimposed image obtained by superimposing the superimposition display data on the visual field of the user easily viewable.

What is claimed is:

1. An apparatus including an image device, the apparatus comprising:
    circuitry configured to:
        detect a tilt of the apparatus with a sensor;
        acquire an environment map;
        determine one of a predetermined flat surface or a curved surface based on the environment map;
        cause a display to display a menu on the one of the predetermined flat surface or the curved surface, when the detected tilt indicates that a user wearing the apparatus is looking down; and
        cause the display to display an output image in accordance with a selection from the menu.

2. The apparatus according to claim 1, wherein the one of the predetermined flat surface or the curved surface is a surface of a ground, a table, or a floor.

3. The apparatus according to claim 1, wherein the circuitry is configured to cause the display to display the output image when the detected tilt of the apparatus exceeds a predetermined value.

4. The apparatus according to claim 1, wherein the menu includes an item corresponding to navigation, game, or mail.

5. The apparatus according to claim 1, wherein the output image is related to a navigation image.

6. The apparatus according to claim 1, wherein the circuitry is further configured to
    acquire the environmental map based on an image of a surrounding environment captured by the image device; and
    detect the one of the predetermined flat surface or the curved surface in the captured image of the surround environment on which the menu is displayed.

7. The apparatus according to claim 1, wherein items included in the menu are displayed non-linearly.

8. The apparatus according to claim 1, wherein the selection from the menu is made by an operating object.

9. The apparatus according to claim 8, wherein the operating object is a part of the user.

10. A method comprising:
    detecting a tilt of an apparatus with a sensor;
    acquiring an environment map;
    determining, by processing circuitry of the apparatus, one of a predetermined flat surface or a curved surface based on the environment map;
    causing, by the processing circuitry, a display to display a menu on the one of the predetermined flat surface or the curved surface, when the detected tilt indicates that a user wearing the apparatus is looking down; and
    causing, by the processing circuitry, the display to display an output image in accordance with a selection from the menu.

11. A non-transitory computer-readable medium including computer-readable instructions that, when executed by a computer, cause the computer to perform a method of an apparatus, the method comprising:
    detecting a tilt of the apparatus with a sensor;
    acquiring an environment map;
    determining one of a predetermined flat surface or a curved surface based on the environment map;
    causing a display to display a menu on the one of the predetermined flat surface or the curved surface, when the detected tilt indicates that a user wearing the apparatus is looking down; and
    causing the display to display an output image in accordance with a selection from the menu.

* * * * *